(12) United States Patent
Takahashi

(10) Patent No.: US 6,765,730 B2
(45) Date of Patent: Jul. 20, 2004

(54) DISPERSION COMPENSATOR AND DISPERSION COMPENSATING SYSTEM

(75) Inventor: Koichi Takahashi, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/608,018

(22) Filed: Jun. 30, 2003

(65) Prior Publication Data

US 2004/0027690 A1 Feb. 12, 2004

(30) Foreign Application Priority Data

Jul. 3, 2002 (JP) ........................................ 2002-194760

(51) Int. Cl.[7] .............................................. G02B 17/00
(52) U.S. Cl. ...................... 359/727; 359/730; 359/615; 359/868
(58) Field of Search ................................ 359/726–727, 359/730, 732, 558, 563, 566, 337.5, 569–573, 577, 675, 838–839, 850–851, 857, 862–864, 868; 398/29

(56) References Cited

U.S. PATENT DOCUMENTS

| | | | |
|---|---|---|---|
| 5,973,838 A | 10/1999 | Shirasaki | 359/577 |
| 6,028,706 A * | 2/2000 | Shirasaki et al. | 359/577 |
| 6,296,361 B1 | 10/2001 | Shirasaki et al. | 359/868 |
| 6,301,048 B1 | 10/2001 | Cao | 359/566 |
| 6,343,866 B1 | 2/2002 | Cao et al. | 359/868 |
| 6,469,831 B2 * | 10/2002 | Iizuka | 359/565 |
| 6,556,320 B1 * | 4/2003 | Cao | 398/65 |
| 2002/0122256 A1 | 9/2002 | Mitamura et al. | 359/577 |

FOREIGN PATENT DOCUMENTS

| | | |
|---|---|---|
| JP | 11-223745 | 8/1999 |
| JP | 2000-028849 | 1/2000 |
| JP | 2000-75165 | 3/2000 |
| JP | 2002-258207 | 9/2002 |
| WO | WO 98/35259 | 8/1998 |

* cited by examiner

*Primary Examiner*—Jordan M. Schwartz
(74) *Attorney, Agent, or Firm*—Kenyon & Kenyon

(57) ABSTRACT

A dispersion compensator is formed by an angular dispersion element, a diffracting optical element, and a reflecting mirror. By forming a reflecting surface in free-formed surfaces which are different between Y-Z plane and X-Z plane and shifting a reflecting position on a reflecting surface per wavelengths, dispersion and dispersion slope are compensated by having an optical path length difference per wavelengths. By doing this, it is possible to realize a dispersion compensator which can compensate dispersion and dispersion slope simultaneously with low loss.

39 Claims, 8 Drawing Sheets

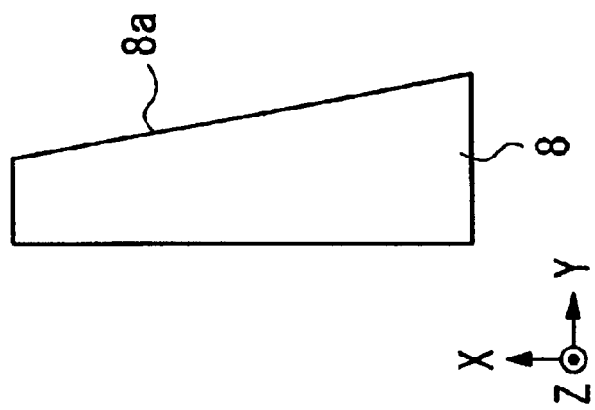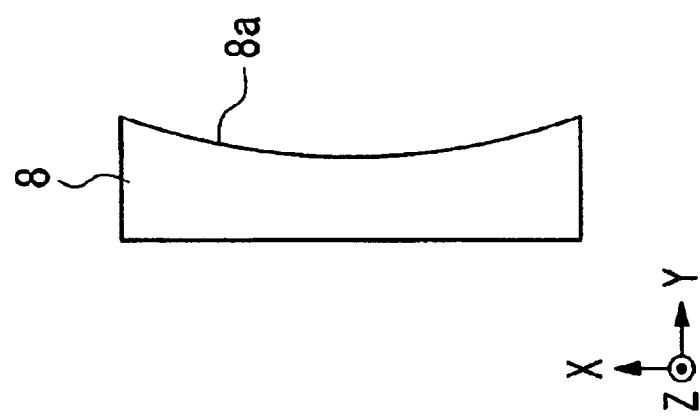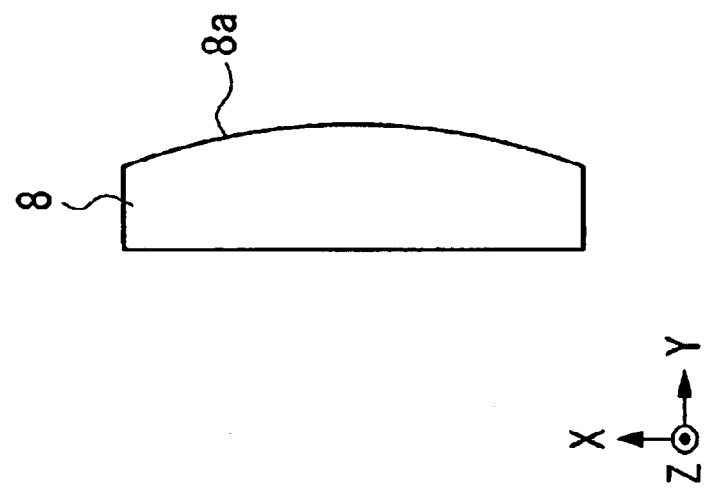

FIG. 7
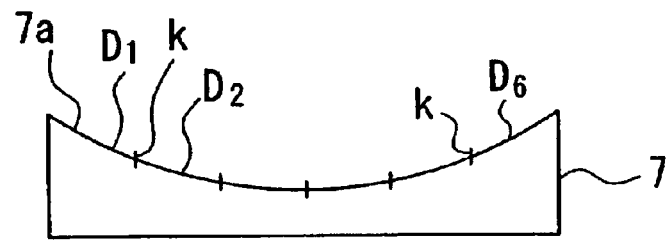
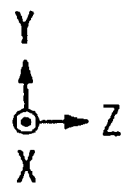
FIG. 8
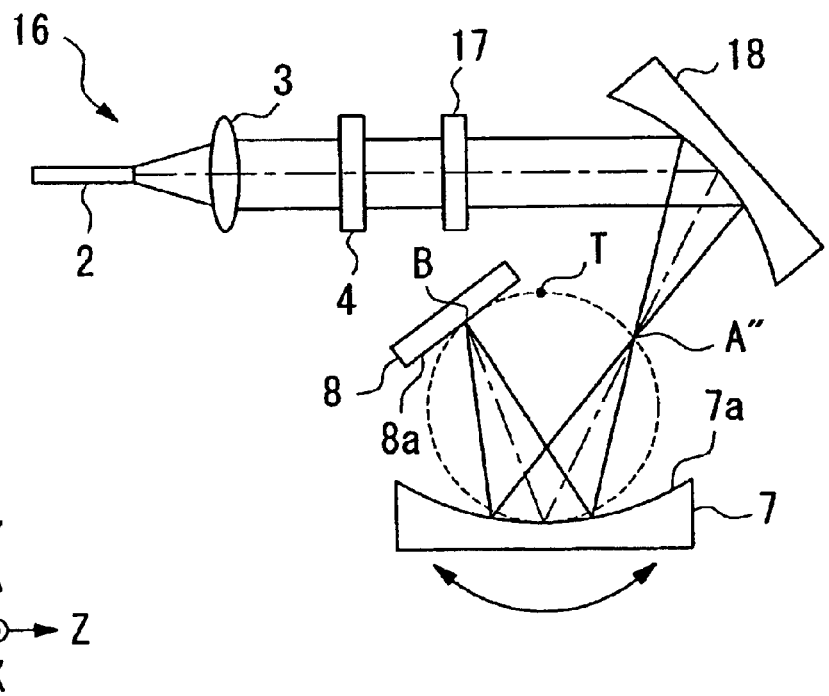
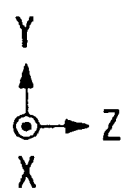

DISPERSION COMPENSATOR AND DISPERSION COMPENSATING SYSTEM

INCORPORATED BY REFERENCE

The present application is based on patent application No. 2002002-194760 filed in Japan, the content of which is incorporated herein by reference.

BACKGROUND OF THE INVENTION

1. Field of the Invention

The present invention relates to a dispersion compensator for compensating for a deterioration in an optical signal which is caused by a dispersion of a light which is transmitted in an optical transfer element such as an optical fiber which is used for an optical communication. The present invention particularly relates to a dispersion compensator which can compensate a chromatic dispersion and a dispersion slope which are caused in the optical transfer element.

2. Description of Related Art

There has been an increasing requirement for larger capacity in an optical communication system as a traffic in a communication increases according to an Internet which is rapidly used commonly. Conventionally, larger communication capacity has been realized by increasing a transmission speed based on a faster processing speed in an electronic circuit. However, a recent request for increasing the communication traffic exceeds what can be realized by making use of faster processing speed in such an electronic circuit. Presently, it is inevitable to use a wavelength division multiplexing (hereinafter called WDM) method together with the higher speed processing operation by an electronic circuit.

Presently, an optical transmission speed which is commercially realized has a limit such as 10 Gb/s. According to the latest status in this area in the art, a transmission speed such as 40 Gb/s has already been realized under non-commercial condition such as under a Research and Development condition because of an improved electronic device using a composite-semiconductor. Regarding a medium which us used for an optical communication, there is a serious problem wider width in a transmission pulse width caused by a dispersion in that a transmission speed of a light which exists in a transmission medium alters based on a wavelength or a polarization condition of a light in case of a high transmission over 10 Gb/s. It is understood that it is necessary to reduce a decrease an entire system for transmitting a light to zero.

For Methods for decreasing such a dispersion, following methods can be commonly used for example. In a method, dispersion in an optical fiber is reduced by using a dispersion shift fiber which adjust a zero-dispersion wavelength in a fiber to a transmission wavelength. In other method, a dispersion compensation fibers (hereinafter called DCFs) which have an opposite characteristics to an optical fiber such as a single mode fiber (hereinafter called SMF) are disposed in constant intervals have been used commonly.

On the other hand, more strict control for dispersion is required under condition of transmission speed such as 40 Gb/s; thus, it is necessary to correct the dispersion in an optical fiber which is caused by a temperature condition dynamically.

In order to solve such problems, a fiber brag-grating (hereinafter called an FBG) and a virtually-imaged-phased-array (hereinafter called a VIPA) have been proposed. For a dispersion compensator using a VIPA, a dispersion compensator can be named which is disclosed in a patent document such as Published Japanese Translation No. 2000-511655 of PCT. In this dispersion compensator, a light which is ejected from an optical fiber is collimated. After that, the collimated light is condensed and transmitted through a VIPA which is disposed in a focal point of the transmitted light. Thus, a light flux which can be identified according to each wavelength therein is generated so as to be a parallel light. The parallel light is condensed and reflected by a reflection mirror which is disposed in a focal point. The reflected light returns to an optical fiber by reversing the reflected light in the same optical system thereabove.

According to such a dispersion compensator, a light which is outputted from the VIPA is condensed in a different point on the reflecting mirror, and a surface on on the reflection is formed in a certain shape. By doing this, it is possible to generate an optical path length difference. Thus, a chromatic dispersion is compensated because different wavelengths transmit for different distances.

For a member to compensating the dispersion slope, a dispersion compensator which is disclosed in a patent document such as U.S. Pat. No. 6,301,048 is proposed. According to the document, a method is disclosed by which a dispersion and a dispersion slope are compensated concurrently by using a VIPA and a diffracting grating.

SUMMARY OF THE INVENTION

An object of the present invention is to provide a dispersion compensator which can compensate a chromatic dispersion and a dispersion slope under condition that an insertion loss can be restricted in a minimum level.

Another object of the present invention is to provide a dispersion compensator and a dispersion compensating system which do not need a large space for realizing functions for varying a dispersion to be compensated and a dispersion slope.

A dispersion compensator according to the present invention is characterized in comprising an angular dispersion element for changing an angle of a light which is ejected from an optical transfer element according to a wavelength in the ejected light, a diffracting optical element having at least a concave reflecting surface so as to diffract the ejected light, and a reflecting mirror having a reflecting surface which is disposed near a focal point in an entire optical system of which surface shape of the reflecting mirror changes in a dispersing direction of the ejected light according the wavelength in the ejected light.

Also, a dispersion compensator according to the present invention is characterized in comprising an angular dispersion element for changing an angle of a light which is ejected from an optical transfer element according to a wavelength in the ejected light, an optical element having a light-condensing function, a diffracting optical element having at least a concave reflecting surface so as to diffract the ejected light, and a reflecting mirror having a reflecting surface which is disposed near a focal point in an entire optical system of which surface shape of the reflecting mirror changes in a dispersing direction of the ejected light according the wavelength in the ejected light.

Also, it may be acceptable that the focal point in which an image is focused by the optical element and the reflecting surface of the reflecting mirror are disposed on a circumference which is formed according to a radius of curvature in the concave reflecting surface in the diffracting optical element.

Also, according to the present invention, a dispersion compensator is characterized in comprising an angular dispersion element for changing an angle of a light which is ejected from an optical transfer element according to a wavelength in the ejected light, an optical element having a light-condensing function, an optical deflecting device for deflecting a light which is ejected from the optical element near a focal point in which the light which is ejected from the optical element is focused, a diffracting optical element having at least a concave reflecting surface so as to diffract the ejected light, and a reflecting mirror having a reflecting surface which is disposed near a focal point in an entire optical system of which surface shape of the reflecting mirror changes in a dispersing direction of the ejected light according the wavelength in the ejected light.

Also, according to the present invention, it may be acceptable that the reflecting surface on the optical deflecting device and the reflecting surface on the reflecting mirror are disposed on a circumference which is formed according to a radius of curvature in the concave reflecting surface in the diffracting optical element.

Also, it may be acceptable that the diffracting optical element is a concave-surfaced diffracting grating, and a grating pitch in the concave-surfaced diffracting grating differs according to an area on a concave-surfaced reflecting surface. Also, it may be acceptable that the grating pitch in the concave-surfaced diffracting grating differs according to an area in a direction orthogonal to a direction of chromatic dispersion by the angular dispersion element which is disposed on the concave reflecting surface.

Also, it may be acceptable that the diffracting grating is provided with a blaze angle.

Also, it may be acceptable that the focal point in which an image is focused by the optical element and the reflecting surface of the reflecting mirror are movable such that the focal point in which an image is focused by the optical element and the reflecting surface of the reflecting mirror maintain such a relationship to be disposed on a circumference which is formed according to a radius of curvature in the concave reflecting surface in the diffracting optical element.

Also, it may be acceptable that the diffracting optical element can be rotated around a fulcrum which is disposed in a center of a curvature in the reflecting surface of the diffracting optical element.

Also, it may be acceptable that the reflecting surface on the reflecting mirror has a power at least in a surface orthogonal to a direction of chromatic dispersion by the angular dispersion element.

Also, it may be acceptable that the reflecting surface on the reflecting mirror has a power at least in a plane which includes a direction of chromatic dispersion by the angular dispersion element.

Also, it may be acceptable that the reflecting surface on the reflecting mirror is formed in rotatively an asymmetrical free-form surface.

Also, it may be acceptable that the reflecting surface on the reflecting mirror is provided with a surface which is disposed diagonally in an incident optical axis at least in a plane which includes a direction of chromatic dispersion by the angular dispersion element.

Also, it may be acceptable that the reflecting surface on the reflecting mirror is movable in a direction approximately orthogonal to an incident optical axis.

Also, it may be acceptable that the reflecting surface on the reflecting mirror is movable at least in a surface orthogonal to a direction of chromatic dispersion by the angular dispersion element.

Also, it may be acceptable that the reflecting surface on the reflecting mirror is movable in a plane which includes a direction of chromatic dispersion by the angular dispersion element.

Also, it may be acceptable that an optical surface or an optical member which has a positive power is disposed in a plane which includes at least a surface in a direction in which a wavelength is dispersed by the angular dispersion element in an optical path between the angular dispersion element and the reflecting surface on the reflecting mirror.

Also, it may be acceptable that the optical surface which has a positive power in a plane which includes a direction of chromatic dispersion by the angular dispersion element is a reflecting surface made by the concave-surfaced diffracting grating.

Also, it may be acceptable that the reflecting surface made by the concave-surfaced diffracting grating is an anamorphotic surface.

Also, it may be acceptable that the reflecting surface made by the concave-surfaced diffracting grating is rotatively an asymmetrical free-form surface.

Also, it may be acceptable that the optical member which has a positive power in a plane which includes a direction of chromatic dispersion by the angular dispersion element is a cylindrical lens which is disposed between the angular dispersion element and the reflecting mirror.

Otherwise, it may be acceptable that the optical member which has a positive power in a plane which includes a direction of chromatic dispersion by the angular dispersion element is an anamorphotic lens or a free-form-surfaced lens which is disposed between the angular dispersion element and the reflecting mirror.

Also, it may be acceptable that the optical element is an optical deflecting device which is provided with a reflecting surface which has a positive power. In the present invention, it may be acceptable that the optical deflecting device is a reflecting diffracting grating.

Also, it may be acceptable that the optical element is a concave-surfaced mirror having a positive power which is disposed between the angular dispersion element and the diffracting optical element.

Also, according to the present invention, it may be acceptable that the concave-surfaced mirror is an anamorphotic concave-surfaced mirror.

Also, it may be acceptable that the optical element is provided with a free-form reflecting surface which is disposed between the angular dispersion element and the diffracting optical element.

In the present invention, an interferometer, a Fabry-Pérot-interferometer, an etalon, a VIPA, a diffracting grating, or a prism can be used for an angular dispersing element.

Also, in the present invention, it may be acceptable that the diffracting grating is provided with a surface having a blaze angle.

According to the present invention, a dispersion compensating system is characterized in comprising a dispersion compensator of the above aspect of the present invention, a signal monitor which monitors a light which is ejected from the dispersion compensator and outputs a signal which contains at least an information for a dispersion of the light or an information for a dispersion slope, and a control device which controls a movement of the reflecting mirror such that at least a dispersion or a dispersion slope is reduced according to the signal which is outputted from the signal monitor.

Also, in a dispersion compensating system, it may be acceptable that a deflecting angle by an optical deflecting device is controlled instead of using a reflecting mirror so as to adjust at least one of the chromatic dispersion or the dispersion slope automatically. Otherwise, it may be acceptable that a position of the diffracting optical element is controlled.

BRIEF DESCRIPTION OF THE DRAWINGS

FIG. 1A shows a general structure for the dispersion compensator view in a Y-Z plane. FIG. 1B show a general structure for the dispersion compensator viewed in an X-Z plane.

FIGS. 4A to 4C show a cross sections for reflecting mirrors. FIG. 4A is a cross section viewed in an E—E line shown in FIG. 1A. FIG. 4B is a cross section viewed in an F—F line shown in FIG. 1A. FIG. 4C is a cross section showing a modification example for a reflecting mirror.

FIG. 5A shows a general structure for the dispersion compensator viewed in a Y-Z plane. FIG. 5B shows a general structure for the dispersion compensator viewed in an X-Y plane.

FIG. 6A shows a general structure for a dispersion compensator viewed in a Y-Z plane. FIG. 6B shows a general structure for the dispersion compensator viewed in an X-Z plane.

FIG. 7 is a magnified view for a concave-surfaced diffracting grating shown in FIG. 6A.

FIG. 8 is a general structure according to a third embodiment of the present invention viewed in a Y-Z plane.

DETAILED DESCRIPTION OF THE INVENTION

Embodiments of the present invention are explained with reference to the attached drawings as follows.

Figure 1A:
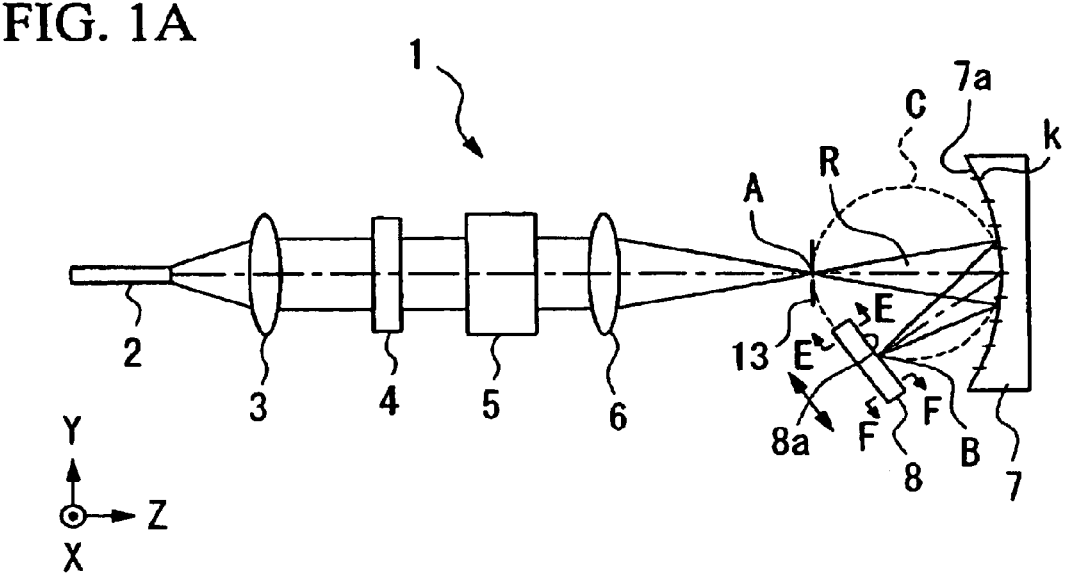
FIGS. 1A and 1B show an optical system for a dispersion compensator according to a first embodiment of the present invention.
Figure 1B:
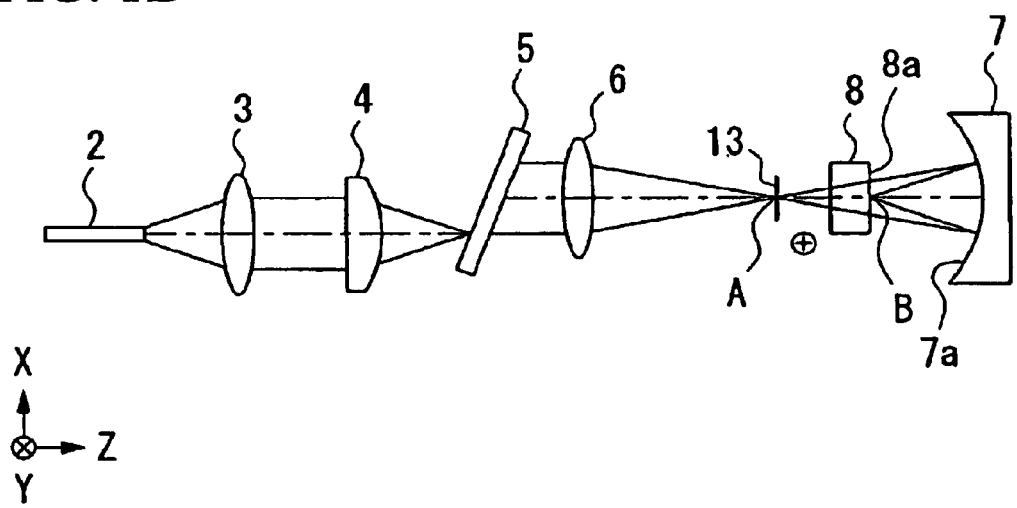
Figure 2:
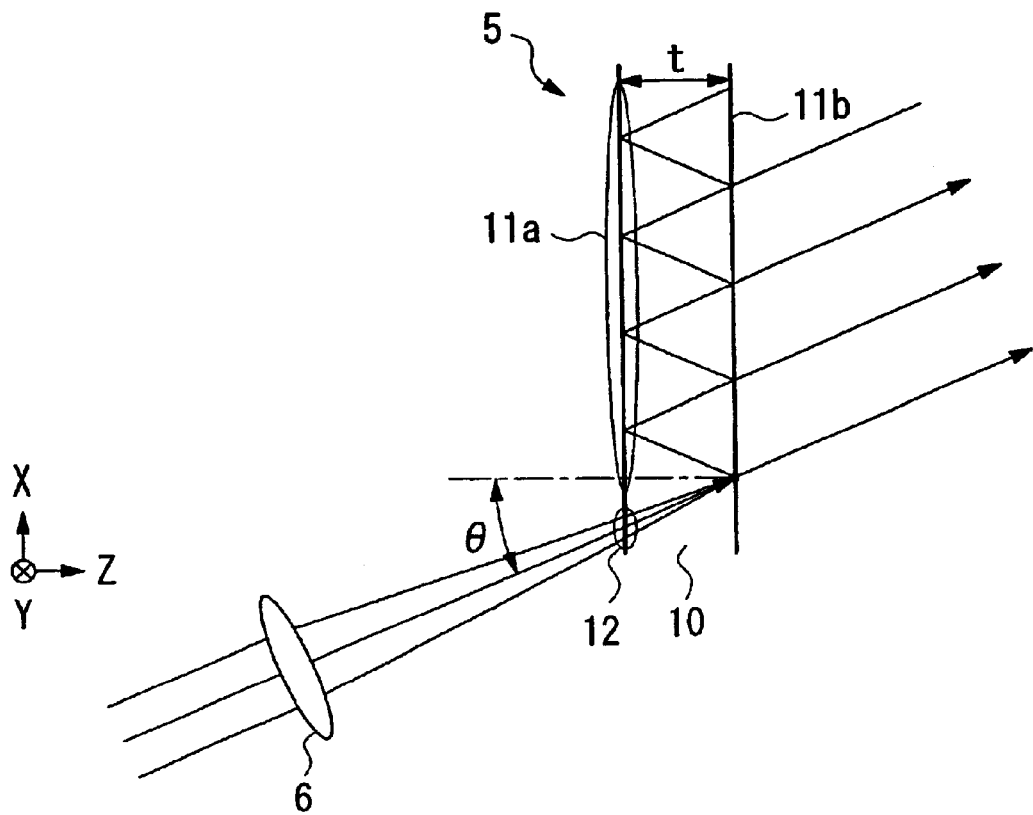
FIG. 2 is a magnified view for explaining a chromatic dispersion in a light which transmits through a Fabry-Pérot-interferometer shown in FIG. 1B.
Figure 3:
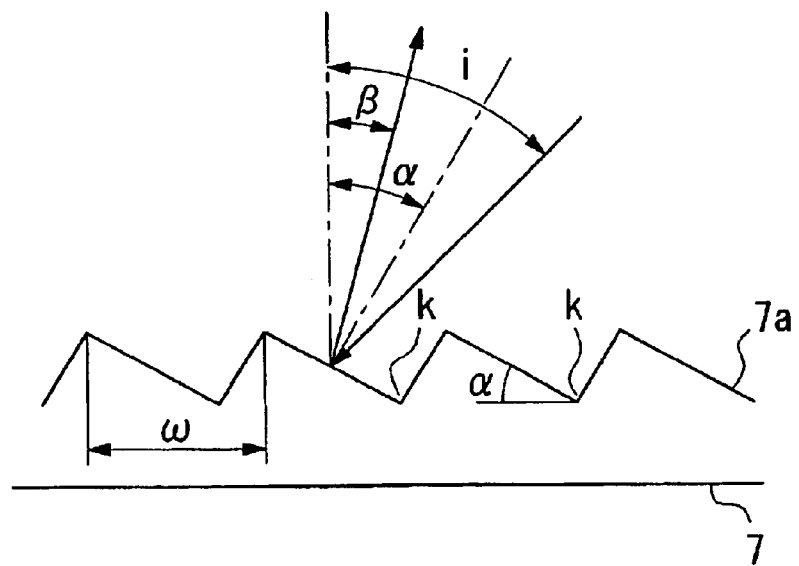
FIG. 3 is a magnified cross section for showing a blaze angle on a reflecting surface on a concave-surfaced diffracting grating.

FIGS. 1A to 4C show a first embodiment of the present invention. FIGS. 1A to 1C show a general structure for a dispersion compensator according to the present embodiment. FIG. 1A shows a general structure for an optical system viewed in a Y-Z plane. FIG. 1B shows a general structure for an optical system viewed in an X-Z plane. FIG. 2 is a magnified view for explaining a chromatic dispersion in a light which transmits through a Fabry-Pérot-interferometer shown in FIG. 1B. FIG. 3 is a magnified cross section for showing a blaze angle on a reflecting surface on a concave-surfaced diffracting grating. FIGS. 4A to 4C show a cross sections for reflecting mirrors. Here, in FIGS. 1A to 1C, an XYZ coordinate system is an orthogonal coordinate system in which a Z-axis is disposed such that its right-hand direction is a positive direction in the drawing. FIG. 1A shows an optical system in a Y-Z plane. FIG. 1B shows an optical system in a X-Z plane. However, even if an X-axis and a Y-axis are converted each other in these drawings, it is different only in that an optical system in a dispersion compensator 1 is disposed vertically or horizontally. That is, that makes no difference whatever coordinate system is employed as far as an essential point in the present invention is concerned. Also, an optical path which is described in each drawing represents only a light having a certain wavelength.

A dispersion compensator 1 shown in FIGS. 1A and 1B compensates a chromatic dispersion and a dispersion slope in a light which is transmitted through an optical fiber (an optical transfer element) in an optical communication system. The dispersion compensator 1 comprises a collimating lens 3 for collimating a light which is ejected from an optical fiber 2 into a parallel light, a cylindrical lens 4 which has a positive power only in an X-Z plane and condenses the parallel light in an axial direction such as in the X-Z plane, a Fabry-Pérot-interferometer 5 (angular dispersing element) which is disposed near a focal point of the cylindrical lens 4, a condensing lens 6 (optical element) for condensing an approximate parallel light in a focal point position A which is ejected by the Fabry-Pérot-interferometer 5 under dispersed condition according to its wavelength, a concave-surfaced diffracting grating 7 (diffracting optical element) for reflecting the light flux which is condensed in the focal point position A under condition that the diffracting angle is differentiated according to the wavelength, and a reflecting mirror 8 for reflecting the reflected light at the focal point on the reflecting surface 8 a so as to reverse the reflected light through the same path as the above optical path.

This is a basic structure in an optical system in a dispersion compensator 1. A Fabry-Pérot-interferometer 5 in the optical system in the dispersion compensator 1 is explained with reference to FIG. 2. A Fabry-Pérot-interferometer 5 is made of an optical glass member in which a medium is an approximate board member having a refractive index such as n. On both sides of the Fabry-Pérot-interferometer 5, a first reflecting layer 11a and a second reflecting layer 11b are disposed approximately in parallel. The first reflecting layer 11a which is disposed where a light is incident is a reflecting surface having approximately 100% of reflection ratio. The second reflecting layer 11b which is disposed where a light is ejected therefrom a reflecting surface having less reflecting ration than that of the first reflecting layer 11a. Such a reflecting ratio may be, for example, approximately less than 100% such as 95%. It may be understood that the Fabry-Pérot-interferometer 5 is equivalent to a VIPA. It may be acceptable if a VIPA is disposed instead of the Fabry-Pérot-interferometer 5.

In the first reflecting layer 11, a portion which corresponds to an incident window 12 to which a light which is condensed by the cylindrical lens 4 is removed. A transmission ratio of the incident light at the incident window 12 is set to be approximately 100%. Therefore, when the condensed light is incident in an optical glass member 10 in the Fabry-Pérot-interferometer 5 by an incident angle θ, the condensed light is focused on the second reflecting layer 11b in an axial direction preferably. As shown in FIG. 2, the condensed light is reflected between the first reflecting layer 11a and the second reflecting layer 11b repeatedly under condition of a multi-reflection. A self-interference is generated by such a multi-reflection of the incident light. By this self-interference, a light is ejected. It is possible to distinguish the ejected light from an ejected light which is formed to correspond to an incident light having other wavelength in a continuous wavelength range from a space point of view. An ejecting angle of the ejected light is differentiated according to the wavelength; thus, an interference occurs.

In FIGS. 1A to 2, a light which is ejected from the Fabry-Pérot-interferometer 5 is dispersed in the X-Z plane based on its wavelength. In the present specification, the X-Z plane is defined as a surface which includes a direction in which a wavelength is dispersed by the angular dispersion element. A Y-Z plane is a surface orthogonal to a direction of chromatic dispersion by the angular dispersion element.

It is possible to understand that a light which is ejected from the Fabry-Pérot-interferometer 5 is an approximate parallel light; thus, it is possible to handle such a light as a parallel light.

Under condition that an interval (thickness) of an optical glass member 10 is defined as t in a Fabry-Pérot-interferometer 5 (or a VIPA) and an optical path length difference between neighboring multi-transmitted lights which transmit the second reflecting layer 11b to be ejected is defined as L, a relationship such as L=2nt cos θ is effective. Under condition that a wavelength in a bright stripe in an m dimension caused by the interference is defined as X, a relationship such as mλ=2nt cos θ is effective. This function is differentiated; thus, an angular dispersion Df can be represented by a following formula.

$$Df = d\theta/d\lambda = m/2nt \cos\theta = 1/\lambda \cdot \cos\theta.$$

By such an angular dispersion, an approximate parallel light is formed which has different ejecting angles due to a difference in a wavelength of an incident light. Also, an equivalent effects can be realized even if an air is used instead of an optical glass member 10 for a medium having a thickness t and the first reflecting layer 11a and the second reflecting layer 11b are disposed so as to sandwich the medium. In such a case, an optical path in the medium is formed by an air; therefore, there is less influence caused by a varying temperature.

Also, an interference stripe which is formed by the ejected light is explained.

An area in which a dimension does not overlap is called a free spectrum range $\Delta\lambda_R$ When an interference stripe having m dimension is formed in a direction θ which satisfies a relationship such as mλ=2nt cos θ, an interference stripe having (m+1) dimension is formed in a direction (θ−Δθ). That is, a relationship such as (m+1)λ=2nt cos(θ−Δθ) is effective. Here, if an interference stripe is formed by a light having an m dimension and (λ+Δλ) in a direction (θ−Δθ), a following relationship is effective $$m(\lambda+\Delta\lambda) = 2nt \cos(\theta-\Delta\theta)$$

The above relationship indicates a difference of direction $\Delta\theta_R$ under condition that a dimension of the interference stripe having wavelength λ differs by only 1 (one).

$$\Delta\lambda_R = d\lambda/d\theta \Delta\theta R = \lambda^2/2nt \cos\theta \approx \lambda^2/2nt$$

That is, a free spectral range $\Delta\lambda_R$ becomes small if nt is small. For example, under condition that a wavelength is 1550 nm, t=0.8 mm, n=1.65, $\Delta 80_R \approx 1$ nm. Therefore, it is possible to obtain an outputted light of which ejection angle varies in thie wavelength width repeatedly.

A light which transmits through the Fabry-Pérot-interferometer 5 becomes an approximate parallel light flux. The approximate parallel light flux transmits through the condensing light 6. The condensed light is focused on a focal point A (a first focusing point) disposed in a focal distance of the condensing lens 6. If a slit 13 is disposed near the focal point A, it is possible to eliminate an unnecessary light. A concave-surfaced diffracting grating 7 is a reflecting diffracting grating which has a curvature. In the concave-surfaced diffracting grating 7, a grating groove k or a protrusion is formed. That is, a reflecting surface 7a on the concave-surfaced diffracting grating 7 forms a concave surface such that a circumference having a curvature radius R is formed on a surface (Y-Z plane) which is orthogonal to a direction in which a wavelength in a light is dispersed by an angular dispersing element (Fabry-Pérot-interferometer 5). The reflecting surface 7a forms a free-form surface in an X-Z plane which includes a direction in which a wavelength is dispersed by the angular dispersing element. Furthermore, the grating groove (or a grating protruding section) k is formed in an X axis direction such that a diffracting function is realized in a surface (Y-Z plane) which is orthogonal to a direction of chromatic dispersion by the angular dispersing element. That is, a plurality of grating grooves k are disposed so as to expand in approximately parallel with the X axis direction on the reflecting surface 7a in the Y-Z plane Here, FIG. 3 is an example for a concave-surfaced diffracting grating 7. If a shape of the grating groove k which is formed on a concave-surfaced reflecting surface 7a in the concave-surfaced diffracting grating 7 is formed as an Ecehelette diffracting grating which has a stepwise cross section which is orthogonal in a direction in which the grating groove expands, a diffraction occurs most evidently in a direction in which a light having a wavelength which satisfies a condition for a mirror reflection to a groove surface, and diffraction does not occur in other dimensions due to a relationship such as i±β=2α (α is an angle made between a diffracting grating surface and a long groove surface) between the incident angle i and the diffracting angle β. Such a direction differs according to the incident angle i. Under condition of i=β, a relationship such as $m\lambda_0 = \omega(\sin i + \sin \beta) = 2\omega \sin \alpha$ is effective based on a formula for the diffracting grating; therefore, the wavelength is determined accordingly. Under condition of m=1, $\lambda_0$ is defined as a blaze wavelength. Here, α is defined as a blaze angle.

A condition that the diffracting intensity becomes maximum when a reflection occurs on a mirror surface on a groove surface is effective only a certain wavelength $\lambda_0$. However, such a reflection is not a geometric reflection; therefore, a condition that the diffracting intensity becomes maximum is effective under quite wide range of wavelength plus or minus $\lambda_0$. Under condition that a values such as m and $\lambda_0$ are constant, it is possible to enhance the resolution if a grating pitch decreases and α increases.

In the dispersion compensator according to the present invention, it is possible to reduce the losses if only a primary diffracted light is used when a light is diffracted by the concave-surfaced diffracting grating 7 in a case in which a diffracting grating is used for an angular dispersing element. Therefore, it is preferable to use a diffracting grating which has a blaze angle. In such a case, it is preferable that such a blaze wavelength is a central wavelength of a light which is inputted to the dispersion compensator.

Also, a diffracting optical element is not limited to a concave-surfaced diffracting grating 7. It may be acceptable if a holographic grating or a holographic optical element (hereinafter called HOE) which makes use of an interference in a laser beam is used.

A reflecting surface 8a on a reflecting mirror 8 has a curved shape which reflects lights having different ejecting angles according to the wavelengths in a direction of a Y-Z plane and a direction of an X-Z plane which are orthogonal each other and compensates the dispersion and the dispersion slope compatibly under condition that a the coordinate system is converted at a reflecting surface and Z axis is defined as an optical axis direction. By doing this, free-formed surfaces are formed differently between, for example, a direction of the Y-Z plane and a direction of the X-Z plane. For example, a convex curved surface is formed in an E—E cross section on a reflecting surface 8a shown in FIG. 1A (see FIG. 4A for reference). A concave-surfaced curved shape is formed in an F—F cross section (see FIG. 4B). Cross sections in both of the curved surfaces changes smoothly and continuously as a free-formed surface.

Here, a reflecting surface 8a on the reflecting mirror 8 can be in various forms such as an anamorphotic surface, a torric surface, a curved-surface, a spherical surface, a flat inclining surface as long as the reflecting surface 8a can compensate the dispersion and the dispersion slope.

Here, a free-formed surface on the reflecting mirror 8 according to the present embodiment can be represented by, for example, a following formula. Here, a Z axis in this formula indicates an axis for a free-formed surface.

$$Z = cr^2 / [1 + \sqrt{1 - (1+k)c^2 r^2}] + \sum_{j=2}^{66} C_j X^m Y^n \quad \text{Formula F1}$$

Here, a first item in the formula F1 indicates a spherical item. A second item in the formula F1 indicates a free-formed surface item. In the spherical item, c indicates a curvature of an apex. k indicates a conic constant. Also, a relationship such as $r = \sqrt{(X^2 + Y^2)}$ is effective.

The free-formed item can be developed in such a form as a following manner shown in a formula F2. Here, Cj indicates a coefficient (j is an interger not smaller than 2).

$$\sum_{j=2}^{66} C_j X^m Y^n = C_2 X + C_3 Y + C_4 X^2 + C_5 XY + C_6 Y^2 + C_7 X^3 + \quad \text{Formula F2}$$
$$C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} Y^4 Y +$$
$$C_{18} X^3 Y^2 + C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 +$$
$$C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7$$

Also, in an Y-Z plane shown in FIG. 1A, a focal point A, a point for reflecting a light which is reflected on a reflecting surface 7a in the concave-surfaced diffracting grating, and reflecting surface 8a on the reflecting mirror 8 are disposed on a circumference of a circle C having a diameter which is equal to a radius R of a curvature on the reflecting surface 7a in the dispersion compensator 1. A circle C which has the above geometric relationship is called a Row-land circle. It is commonly known that a concave-surfaced diffracting grating 7 has a diffracting effect and a focusing effect by such a structure compatibly.

This concave-surfaced diffracting grating 7 has a spectral function and a focusing function by itself. As described in the present embodiment, a diffracted image which is dispersed in the concave-surfaced diffracting grating 7 appears on the same Row-land circle infallibly even any grating constant, any wavelength, and any degree number are selected as long as a primary image point is disposed on the Row-land circle at a focal point A. In addition, it is possible to understand that there is substantially no aberration. However, such characteristics can be realized only in a surface (Y-Z plane) which is orthogonal to a direction of chromatic dispersion by an angular dispersing element. Astigmatism which is focused far away from the Row-land circle occur in a surface (X-Z plane) which includes a direction in which a wavelength is dispersed by an angular dispersing element.

Therefore, in order to correct such an astigmatism, an anamorphotic surface or a free-formed surface is formed such that a curvature and a shape on the reflecting surface 7a on the concave-surfaced diffracting grating 7 changes between a surface (X-Z plane) which includes a direction in which a wavelength is dispersed by an angular dispersing element and a surface (Y-Z plane) which is orthogonal to a direction of chromatic dispersion by an angular dispersing element. Here, a reflecting surface 7a having a concave-surfaced shape in a surface (X-Z plane) which includes a direction in which a wavelength is dispersed serves as a curved surface for correcting astigmatism; therefore, it is possible to improve an image forming characteristics in a focal point B on a reflecting surface 8a on a reflecting mirror 8.

Alternatively, disposing an optical element having different powers in an X-Z plane in an optical path toward the focal point B on a reflecting surface 8a on a reflecting mirror 8 from the primary focal point A, it is possible to improve an image forming characteristics on a focal point B on the reflecting mirror 8.

By the above structure, a light which is reflected at a reflecting surface 7a on a concave-surfaced diffracting grating 7 is condensed on a reflecting surface 8a having a free-form surface on a reflecting mirror 8 as a light flux having different ejecting angles according to its wavelengths due to the Fabry-Pérot-interferometer 5 in an X-Z plane in the dispersion compensator 1. By doing this, an optical path length difference due to wavelengths is compensated, and the chromatic dispersion is compensated. That is, an optical path length difference which is given to a light which is reflected in different positions in an X axis direction on a reflecting surface 8a is determined by a chromatic dispersion in a light which is transmitted through the optical fiber 2. Therefore, it is possible to give an optical path length difference which can compensate the chromatic dispersion optimally to a light by setting a reflecting position on a reflecting surface 8a for reflecting a light to be on a predetermined position in a Z axis direction which can be determined by the chromatic dispersion. Therefore, it is possible to compensate the chromatic dispersion both in a normal dispersion and a negative dispersion.

Here, it is necessary to change an incident position of a light to a reflecting mirror 8 according to the dispersion if the dispersion should be compensated variably. In such a case, as indicated by an arrow shown in FIG. 1A, a reflecting point of a reflecting mirror 8 should be moved relatively to a reflecting surface 8a having a free-formed surface in a surface (Y-Z plane) which is orthogonal to a direction of chromatic dispersion by an angular dispersing element.

Also, as far as a compensation for the dispersion slope, a reflecting surface 7a on a concave-surfaced diffracting grating 7 is a first dimension diffracting grating and has a radius R of curvature and a grating groove (phasing section) k in a (Y-Z plane). Therefore, a light which is reflected at the grating groove k becomes a light flux (diffracted light) having different ejection angles according to its wavelength. A light is condensed on a reflecting point on a reflecting surface 8a having a free-formed surface on a reflecting mirror; thus, the dispersion slope due to the wavelengths is compensated. An optical path length difference which is given to a light which is reflected in different positions in a Y axis direction on a reflecting surface 8a is determined by the dispersion slope in the wavelengths in a light which is transmitted through the optical fiber 2. Therefore, it is possible to give an optical path length difference which can compensate the chromatic dispersion optimally to a light by setting a reflecting position on a reflecting surface 8a for reflecting a light to be on a predetermined position in a Y axis direction which can be determined by the dispersion slope due to each wavelength.

If it is necessary to change the dispersion slope variably, a reflecting point on a reflecting mirror 8 is moved in an X axis direction which is orthogonal to a Y-Z plane shown in FIG. 1a relatively to a reflecting surface 8a having a free-formed surface.

A dispersion compensator according to the present embodiment has the above structure. Next, functions of the dispersion compensator are explained.

In an optical communication system, a chromatic dispersion and a dispersion slope occur in an optical signal which is transmitted through an optical fiber 2 over a long distance. Under such a condition, a group delay occurs. As shown in FIGS. 1A and 1B, a light which is ejected from the optical fiber 2 enters the dispersion compensator 1 while dispersing by a dispersion angle which is determined by a Numerical Aperture (hereinafter called as NA) in the optical fiber 2.

A light flux which is collimated by a collimating lens 3 in the dispersion compensator so as to be a parallel light is condensed by a cylindrical lens 4 only in an axial direction (X-Z plane in FIGS. 1A and 1B). Simultaneously, the condensed light is incident to a Faibry-Pérot-interferometer 5 by an incident angle θ from an incident window 12. The incident light is condensed on a second reflecting layer 11b after going through a glass surface 10.

A multi-reflection of the incident light occurs between the first reflecting layer 11a and the second reflecting layer 11b in the Faibry-Pérot-interferometer 5. Lights having different ejecting angles due to interferences by each wavelength are ejected from the second reflecting layer 11b. It is possible to distinguish the ejected light from an ejected light which is formed by an incident light having other wavelength in a continuous wavelength range from a space point of view. After that, a plurality of ejected lights each of which interfere each other are ejected from the Faibry-Pérot-interferometer 5 and become an approximate parallel light flux.

The light flux becomes a convergent light after transmitting through the condensing lens 5. The convergent light is focused on a focal position A (primary focal point). After that, a light flux of which unnecessary light is removed by a slit 13 becomes a divergent light again and goes forward and is incident to the concave-surfaced diffracting grating 7. A light which is reflected on a reflecting surface 7a on a concave-surfaced diffracting grating 7 becomes convergent as a diffracted light having different ejecting angles based on the wavelength. The convergent light is condensed on a reflecting surface 8a on the reflecting mirror 8.

The light which is reflected on a reflecting surface 8a on the reflecting mirror 8 goes reversely in an onward optical path and returns to the optical fiber 2 via the concave-surfaced diffracting grating 7, a condensing lens 6, a Faibry-Pérot-interferometer 5, a cylindrical lens 4, and a collimating lens 3.

Here, in the incident lights which are distributed in an X axis direction according to the wavelength by the Faibry-Pérot-interferometer 5, ejecting angles are different in the X axis direction. Therefore, the incident position to a reflecting surface 8a on the reflecting mirror 8 is determined according to the wavelengths in the incident lights. A reflecting surface 8a on the reflecting mirror 8 is formed in a preferable free-formed surface along an X axis direction in a surface (X-Z plane) which includes a direction in which a wavelength is dispersed. Therefore, different optical path length which corresponds to the dispersion is given to the incident lights which are distributed in an X axis direction according to wavelengths between the reflecting position in the X axis direction on the reflecting surface 8a and the Faibry-Pérot-interferometer 5. Therefore, it is possible to compensate the chromatic dispersion and solve the group delay by setting a shorter optical path length for a light having a delayed wavelength and longer optical path length for a light which advances between the Faibry-Pérot-interferometer 5 and the reflecting surface 8a.

On the other hand, in a surface (X-Z plane) in a direction orthogonal to a direction of chromatic dispersion by an angular dispersing element, a light which is focused on a focal point A (primary focal point) on the Row-land circle C disperses and is reflected on a reflecting surface 7a on the concave-surfaced diffracting grating 7 so as to be a diffracted light of which ejecting angle differs according to the wavelength, and is reflected on a focal point B on a reflecting surface 8a on the reflecting mirror 8. A grating grooves k are formed in a predetermined pitch in the X axis direction on a reflecting surface 7a on the concave-surfaced diffracting grating 7; therefore, it is possible to disperse the light by different ejecting angles according to the wavelengths. Thus, lights are condensed in different positions in a Y-Z plane on a reflecting surface 8a on the reflecting mirror 8 according to the dispersion slopes of each wavelengths and reflected.

The reflecting surface 8a is formed in a surface (Y-Z plane) in a direction which is orthogonal to a direction of chromatic dispersion by an angular dispersing element in a free-formed surface having a different shape from the free-formed surface in the above X-Z plane; therefore, optical path length differences are given to each wavelengths. Therefore, it is possible to compensate the dispersion slope in each wavelength between the reflecting surface 7a having a concave-surfaced shape on the concave-surfaced diffracting grating 7 and the reflecting surface on the reflecting mirror 8a.

The dispersion slope which can be compensated by a Faibry-Pérot-interferometer 5 is commonly constant. Therefore it is not possible to compensate the dispersion slope. However, it is possible to compensate the dispersion slope simultaneously in a direction which is orthogonal to a direction of this light by the concave-surfaced diffracting grating 7.

As explained above, according to the dispersion compensator 1 according to the present embodiment, it is possible to compensate the chromatic dispersion and the dispersion slope simultaneously in an optical communication system which uses a WDM technique. In addition, by employing a theory of the Row-land circle C, there are advantages in that it is possible to diffract and condense a light only by a concave-surfaced diffracting grating 7 simultaneously, an optical system can be formed in a compact manner. Also, there is an advantage in that there are fewer change in an insertion loss because of three surface structure in the optical elements through which a light transmits from the Faibry-Pérot-interferometer 5 regardless to the chromatic dispersion and the dispersion slope to be compensated.

Regarding such a structure, it is disclosed that a VIPA, a diffracting element, and a condensing lens are disposed in an optical path so as to transmit a light in a conventional dispersion compensator shown in a document of U.S. Pat. No. 6,301,048; therefore, such a dispersion compensator has a defect that there is a large insertion loss because there are four surfaces in the optical elements through which a light transmits from the VIPA.

Hereinafter, other embodiments and modification examples according to the present invention are explained with reference to the attached drawings. The same reference numerals are applied to corresponding members as shown in the first embodiment so as to omit the repeated explanation thereof.

A reflecting surface 8a on the reflecting mirror 8a is not limited to a free-formed surface which is indicated by a formula F1. Other shape can be acceptable. For example, either one or both of X-Z plane and Y-Z plane on the reflecting surface 8a may be flat inclining surfaces as shown in FIG. 4C unless accurate compensation for the dispersion and the dispersion slope is required. In such a case, it is possible to adjust the dispersion and the dispersion slope if the reflecting surface 8a is movable in the Y-Z plane and the X-Z plane in a direction which is orthogonal to an incident light axis.

Figure 5A:
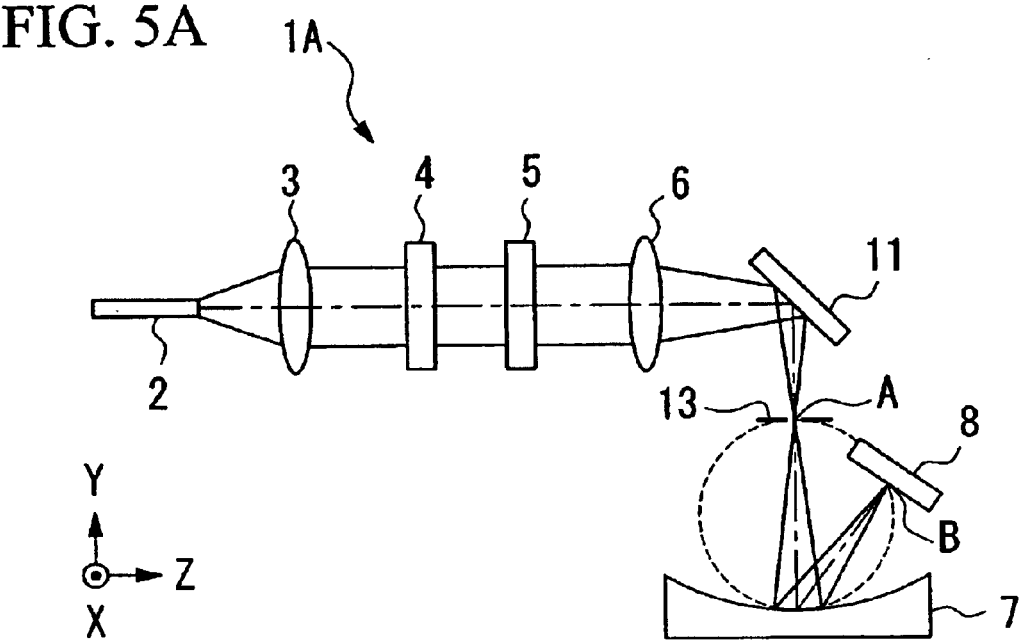
FIGS. 5A and 5B show modification examples for the dispersion compensator according to the first embodiment of the present invention.
Figure 5B:
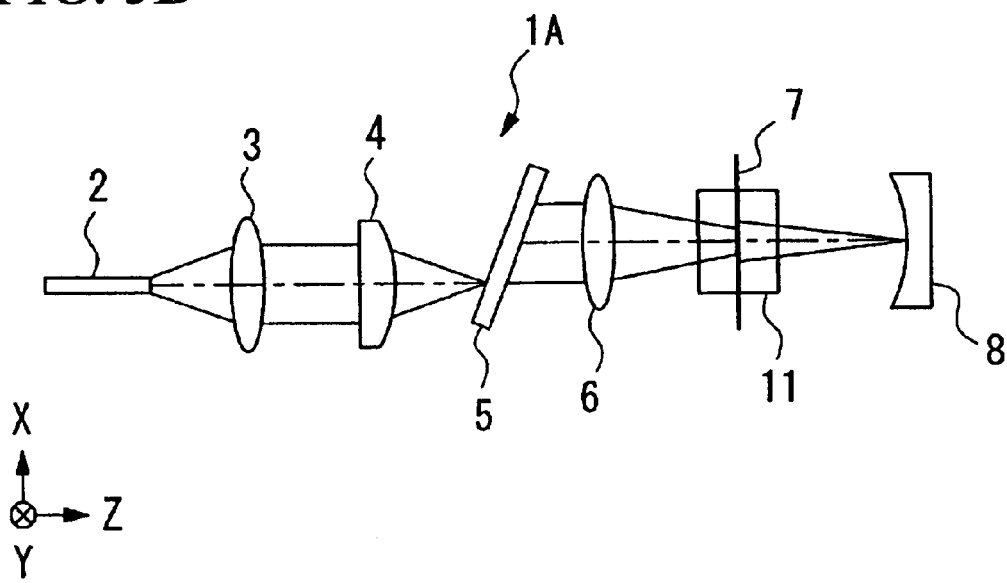

Also, FIGS. 5A and 5B show a modification example for a dispersion compensator 1 according to the first embodiment. In this dispersion compensator 1A, a second reflecting mirror 11 (optical deflecting device) for deflecting an optical path is disposed between the condensing lens 6 and its focal position A. Here, an optical path is deflected by the second reflecting mirror 11 before a convergent light which is ejected from the condensing lens 6 is condensed. The light is incident to the concave-surfaced diffracting grating 7 after the light is focused on the focal position a and is dispersed there. In the modification example shown in FIGS. 5A and 5B, an optical axis of the light flux which is ejected from the condensing lens 6 is bent approximately by 90° in a Y-Z plane.

In such a dispersion compensator 1A, it is possible to set a shorter overall length of the dispersion compensator.

Also, for other modification example, a reflecting diffracting grating (optical deflecting device) can be used instead of the second reflecting mirror 11. In such a case, it may be acceptable that the reflecting diffracting grating is rotatable in Y-Z plane and X-Z plane (around the Z axis) around orthogonal two axes in the dispersion compensator. In such a case, the light which is condensed by the condensing lens 6 in the dispersion compensator 1A is focused (first focus point) on a reflecting surface on the reflecting diffracting grating on the Row-land circle C. The reflected light goes toward the concave-surfaced diffracting grating 7 while the reflected light is dispersed. Here, the reflecting diffracting grating is rotatable; thus, the first focal point is shifted from the Row-land circle C from a strict point of view. However, such a shift is so fine that it is substantially possible to omit by setting conditions therefore preferably.

In order to enhance the wavelength dispersing effect by an angular dispersing element in the reflecting diffracting grating, a grating groove (grating protrusion) is formed only in Y axis direction so as to realize a diffracting effect in X-Z plane. Also, in order to enhance the dispersing effect in the concave-surfaced diffracting grating 7 by the reflecting diffracting grating, a grating groove (grating protrusion) should be formed only in X axis direction. Also, in order to enhance the dispersing effect in both the angular dispersing element and the concave-surfaced diffracting grating 7 by using the reflecting diffracting grating, it is necessary to form a second dimension diffracting grating. In such a case, grating grooves (grating protrusions) should be formed in X axis direction and Y axis direction respectively.

Here, it may be acceptable that the above reflecting diffracting grating is disposed on a reflecting surface on a third reflecting mirror 18 in an optical system in a dispersion compensator 16 shown in FIG. 8 which describing a third embodiment of the present invention which is to be explained later. In such case, equivalent effect can be realized by forming the grating grooves (grating protrusions) on the reflecting diffracting gratings in either one of the both of X axis direction and Y axis direction.

Next, a dispersion compensator 14 according to a second embodiment of the present invention is explained with reference to FIGS. 6A to 6C.

Figure 6A:
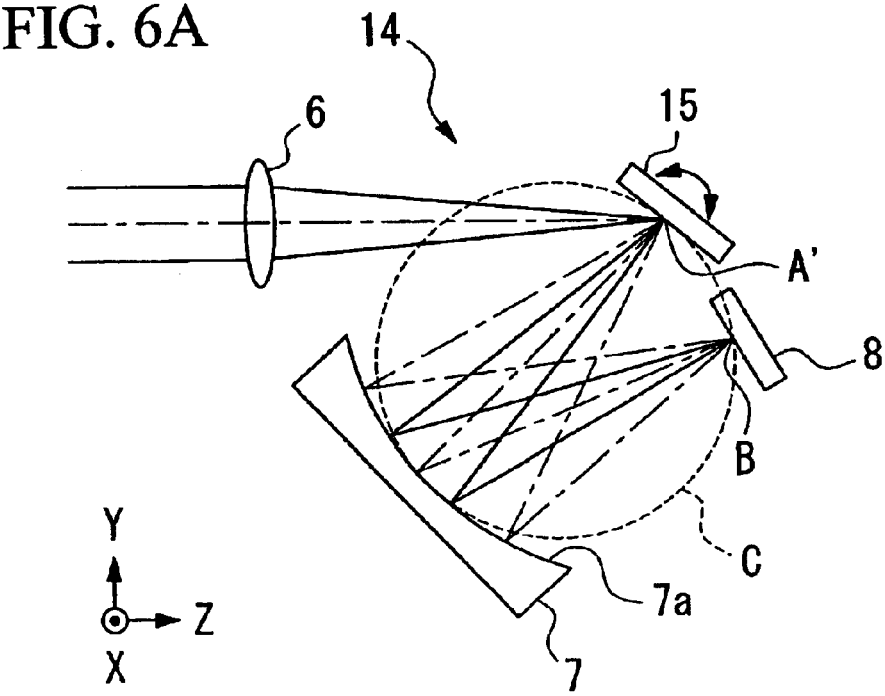
FIGS. 6A and 6B show a dispersion compensator according to a second embodiment of the present invention.
Figure 6B:
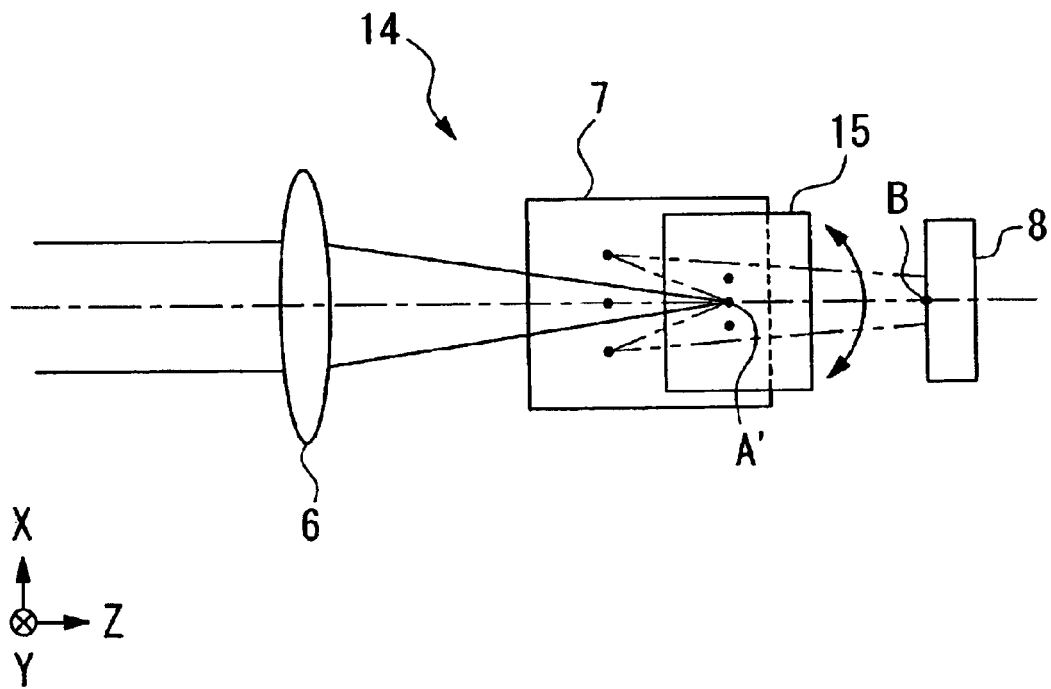

In FIGS. 6a and 6B, members from the optical fiber 2 to the Faibry-Pérot-interferometer 5 are the same as those members in the dispersion compensator 1 shown in FIGS. 1A and 1B. Therefore, these members are omitted in FIGS. 6A and 6B. Here, explanations are made for members from the condensing lens 6 to a reflecting mirror 8.

In FIGS. 6A to 6C, a rotating mirror 15 (optical deflecting device) is disposed on a focal point A' (primary focal point) where a convergent light which is transmitted through the condensing lens 6 is focused. The rotating mirror 15 is rotatable on a focal point A' around the X axis in Y-Z plane. Simultaneously, the rotating mirror 15 is rotatable around Z axis (axis which overlaps the optical axis shown in FIG. 6B) in X-Z plane. Furthermore, the rotating mirror 15 is rotatable around these two axes which are orthogonal each other. The light which is reflected on the rotating mirror 15 is dispersed and reflected on the reflecting surface 7a on the concave-surfaced diffracting grating 7. The reflected light is condensed on a reflecting surface 8a on the reflecting mirror 8 and is reflected there.

Here, a reflecting position as a focal point A' (focal position of a primary image) on the rotating mirror 15, a reflecting surface 7a on the concave-surfaced diffracting grating 7, and a reflecting surface 8a on the reflecting mirror 8 are disposed on a circumference of the Row-land circle C. A radius R of curvature in the concave-surfaced diffracting grating 7 is equal to a diameter of the Row-land circle.

In addition, as shown in FIG. 7, the concave-surfaced diffracting grating 7 is a reflecting surface 7a having a concave surface in Y-Z plane. In the concave-surfaced diffracting grating 7, a plurality of grating grooves (or a plurality of grating protrusions) k are disposed in parallel in X axis direction. Furthermore, the reflecting surface 7a having concave surface is divided in a plurality of regions such as six regions in a direction in which the reflecting surface 7a expands. Disposition pitch of the grating grooves (grating protrusions) k is varied in each regions such as D1, D2, . . . , D6 such that the diffraction constant is varied. By doing this, the rotating mirror 15 rotates in Y-Z plane so as to adjust the deflection angle for a light. By doing this, it is possible to select the diffracting angle for each wavelength in the concave-surfaced diffracting grating 7 preferably. Therefore, it is possible to change the diffracting angle by reflecting a light in any random divided region such as D1, D2, . . . , D6 which are selected. Thus, it is possible to change a position for condensing and reflecting the light toward the reflecting surface 8a having a free-formed surface on the reflecting mirror. Therefore, it is possible to adjust the optical path length difference and compensate various dispersion.

Also, by rotating the rotating mirror 15 around Z axis in X-Z plane, it is possible to select a region for reflecting the incident light of which wavelength is dispersed by the Faibry-Pérot-interferometer 5 by the concave-surfaced diffracting grating 7. By doing this, it is possible to select the required amount of the dispersion slope to be compensated.

Here, the reflecting surface 8a on a reflecting mirror 8 is the same as that in the first embodiment in that different free-formed surfaces can be formed in Y-Z plane and X-Z plane. In the present embodiment, the rotating mirror 15 is rotatable around two axes respectively; thus, it is possible to select the incident region for a wavelength which is reflected on a reflecting surface 7a on a concave-surfaced diffracting grating 7. Therefore, it is possible to disposed the reflecting mirror 8 under a fixed condition. In such a case, a curvature of the reflecting surface 7a on a concave-surfaced diffracting grating 7 near both ends of X-Z plane in X axis direction should be set larger than a curvature in a central region. By doing this, it is possible to compensate the dispersion under condition that the reflected light on a reflecting surface 7a is reliably condensed on a reflecting surface 8a of a reflecting mirror 8.

Here, there is almost no aberration in Y-Z plane with regard to the Row-land circle C. However, there is an astigmatism which is focused in farther shifted position on a focal position in X-Z plane from the Row-land circle C than from the focal position in Y-Z plane as explained above. In order to correct such astigmatism, following methods can be used selectively.

In the present embodiment, a reflecting surface 7a on a concave-surfaced diffracting grating 7 is formed so as to have a different curvature from that in Y-Z plane in order to have a positive power such that an astigmatism can be corrected in X-Z plane. It is possible to improve a focusing characteristics on a focal point B on a reflecting mirror 8 by forming the reflecting surface 7a in an anamorphotic surface or in a free-formed surface.

Otherwise, for an alternative method, it may be acceptable that an optical element which has different power in X-Z plane and Y-Z plane is disposed between the primary focal point and the reflecting mirror 8. For such an optical element, it is possible to use, for example, a lens which as a positive power at least in X-Z plane, a cylindrical lens, an anamorphotic lens, and a lens which has a free-formed surface.

Also, it may be acceptable that a mirror having a positive power at least in X-Z plane is disposed between the concave-surfaced diffracting grating 7 and a reflecting mirror 8, and the reflected light is incident to the reflecting mirror 8. In such a case, it may be acceptable a cylindrical mirror, an anamorphotic mirror, and a mirror which has a free-formed surface are used for such a mirror.

Next, a third embodiment of the present invention is explained with reference to FIG. 8.

In an optical system in the dispersion compensator 16 shown in FIG. 8, an optical fiber 2, a collimating lens 3, a cylindrical lens 4, and an interferometer which are disposed in an optical forwarding direction are the same as those explained in the above embodiments. In the present embodiment, a Faibry-Pérot-etalon (hereinafter calls as etalon) 17 (angular dispersing element) is disposed for an interferometer instead of a Fabry-Pérot-interferometer 5. An etalon 17 has an equivalent structural feature to a Fabry-Pérot-interferometer 5. In the etalon 17, an ejecting angle of a light is varied according to the wavelengths, lights which are distributed in X axis direction according to the wavelengths are ejected, and an approximate parallel light flux goes thereinside.

A third reflecting mirror 18 has a positive power such that the third reflecting mirror 18 reflects a light which is ejected from the etalon 17, bends an optical path toward a reflecting surface 7a on the concave-surfaced diffracting grating 7, and condenses the light. In examples shown in the drawings, a reflecting surface 18a on the third reflecting mirror 18 is formed in a concave curved surface, an optical path of an approximate light flux which is reflected at the reflecting surface 18a is bent and the approximate light flux is condensed and focused on a focal position A". The approximate light flux is further dispersed and reflected on a reflecting surface 7a on a concave-surfaced diffracting grating 7 and focused on a focal point B on a reflecting surface 8a on a reflecting mirror 8 and reflected. Thus, the approximate light flux goes reversely the same optical path.

Here, in the present embodiment, a focal position A", a concave-surfaced diffracting grating 7, a reflecting surface 8a on a reflecting mirror 8 are disposed on a circumference of a Row-land circle C. A diameter of the circle C is equivalent to a radius R of curvature on the concave-surfaced diffracting grating 7. Also, it may be acceptable that a slit 13 is formed near the focal position A" so as to remove an unnecessary light.

Furthermore, in the dispersion compensator 16 according to the present embodiment, as shown in FIG. 7, pitches among a plurality of grating grooves (grating protrusions) k in the concave-surfaced diffracting grating 7 vary in a plurality of divided regions D1, D2, . . . respectively in a direction in which a concave reflecting surface 7a expands in Y-Z plane. In addition, the concave-surfaced diffracting grating 7 is rotatable around a point T as a fulcrum for a rotating center of curvature on a reflecting surface 7a.

Therefore, by rotating the concave-surfaced diffracting grating 7 around the fulcrum T, it is possible to select a chromatic dispersion area for a light which is reflected at the third reflecting mirror 18 for a reflected light which is focused on a reflecting surface 8a on a reflecting mirror 8 which is fixed and supported. Therefore, it is possible to compensate various dispersion slopes as required. In such a case, a reflecting surface 8a on a reflecting mirror 8 has a free-formed surface as described in the above other embodiments can compensate a dispersion slope in wide range of wavelengths.

Here, an angular dispersing element is not limited to a Fabry-Pérot-interferometer 5 and an etalon 17. For an angular dispersing element, it is possible to use other interferometer, a diffracting grating, and a prism.

For example, a case in which an angular dispersing element is a diffracting grating is explained.

In a diffracting grating, a diffraction is represented by a such as $\omega(\sin\theta_g + \sin i) = m\lambda$ (m is a diffracting degree) under condition that $\omega$ indicates a diffracting pitch, i indicates an incident angle, and $\theta_g$ indicates a diffracting angle. Here, the angular dispersion indicates the difference of angles which represents a difference in the spectra according to the wavelength $\Delta\lambda$. Here, if the above formula is differentiated by the wavelength $\lambda$ under condition that $D_g$ indicates an angular dispersion, a formula such as $D_g = d\theta/d\lambda = m/\omega \cos\theta_g$ is effective. Therefore, if it is desirable that the dispersion should increase, $\omega$ should be decreased.

Also, shape of a diffracting grating which can be used for an angular dispersing element is not limited to a shape of an above Echelette diffracting grating. For such a diffracting grating, it is possible to use a grating in which a groove line is drawn, a step grating, a sine wave grating, and a trapezoid grating. Also, it is possible to use a holographic grating which makes use of an interference of a laser beam, and an HOE (holographic optical element).

Also, an angular dispersing element can be a prism.

Figure 9A:
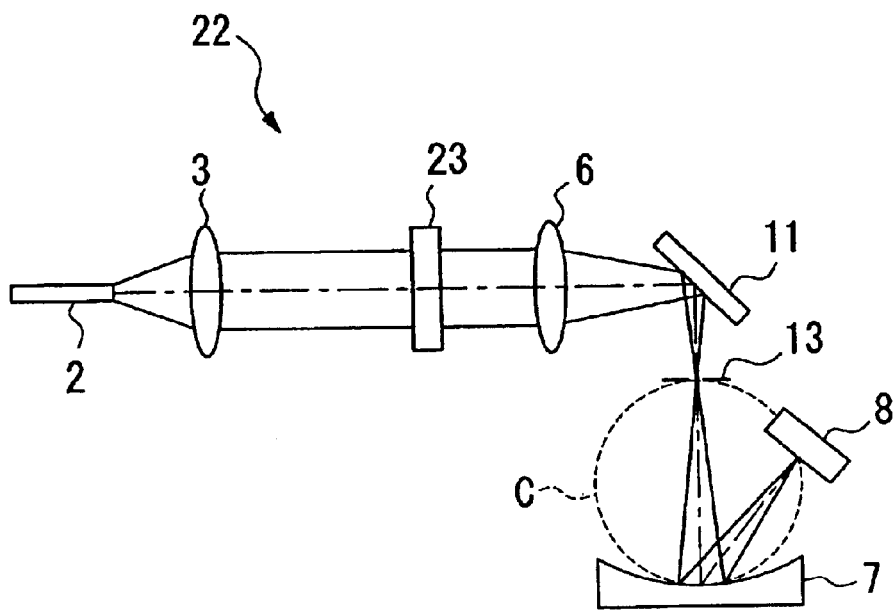
FIGS. 9A and 9B show a dispersion compensator which uses a prism instead of a Fabry-Pérot-interferometer.
Figure 9B:
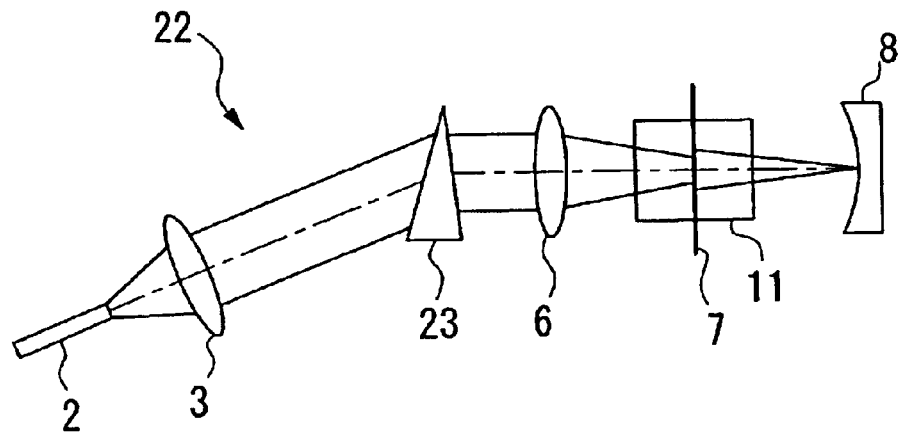

In an optical system in a dispersion compensator 22 shown in FIGS. 9A and 9B, an angular dispersion $D_p$ can be represented by a following formula under condition that a prism 23 is used instead of a concave-surfaced diffracting grating 7 in the above embodiment.

$$D_p = d\theta/d\lambda = 2 \sin(\phi/2)/(1-n^2 \sin^2(\phi/2))^{1/2} \cdot dn/d\lambda$$

Here, $\theta_p$ indicates an angle of deviation. $\phi$ indicates an apex angle of a prism. $dn/d\lambda$ indicates a dispersion in a material member for forming a prism. As understood from the above formula, an angular dispersion $D_p$ is determined by an apex angle $\phi$ of a prism, a refractive index n in a member for forming a prism, and a dispersion $dn/d\lambda$. Each member for forming a prism has its most preferable apex angle $\phi$ according to by what kind of material the member is formed. An apex angle 100 is determined by an angular dispersion $D_p$ according to various apex angles and an energy which is utilized. It may be preferable that a prism angle should commonly be larger if a member for forming a prism has a small refractive index n. Therefore, it is preferable for an angular dispersion $D_p$ if a product by a refractive index n and sin ($\phi/2$) is as large as possible.

Next, a fourth embodiment of the present invention is explained with reference to FIG. 10.

Figure 10:
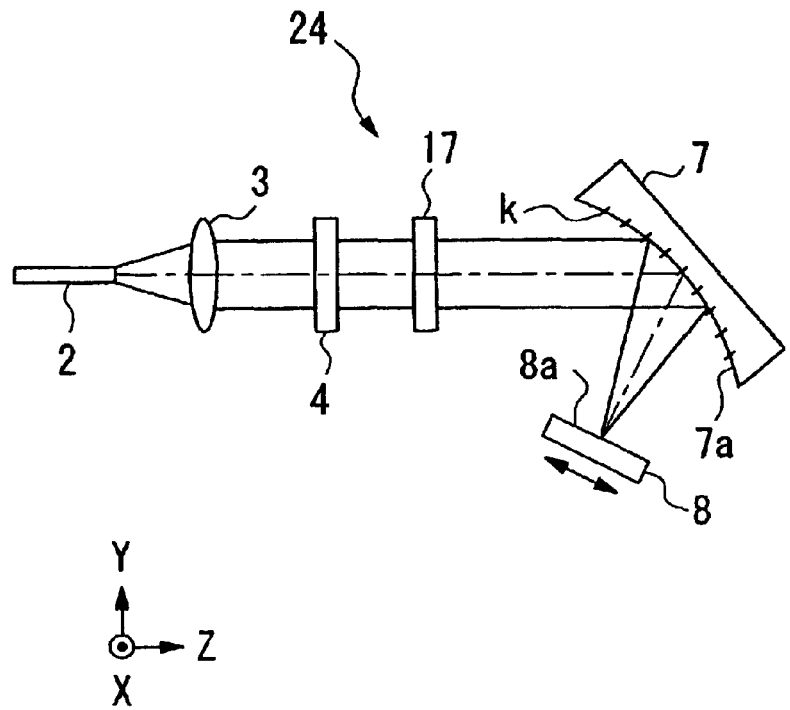
FIG. 10 is a general view for a dispersion compensator according to a fourth embodiment of the present invention viewed in a Y-Z plane.

In a dispersion compensator 24 shown in FIG. 10, a collimating lens 3, a cylindrical lens 4, and an etalon 17 which are disposed in an optical forwarding direction of a light which is ejected from the optical fiber 2 are the same as those explained in the above third embodiment. An ejecting angle of a light which is ejected from the etalon 17 is changed according to the wavelengths. Lights which are distributed according to the wavelengths are ejected in X axis direction so as to be an approximate parallel light flux; thus, the approximate parallel light flux goes thereinside.

Consequently, a concave-surfaced diffracting grating 7 which reflects a light which is ejected from the etalon 17 is disposed. A light which is reflected by the concave-surfaced diffracting grating 7 is reflected on a reflecting surface 8a on a reflecting mirror 8. A reflecting surface 7a on a concave-surfaced diffracting grating 7 has a positive power such that an optical path is bent toward the reflecting mirror 8 and a light is condensed thereon.

The concave-surfaced diffracting grating 7 has a curvature. Also, the concave-surfaced diffracting grating 7 is a reflecting diffracting grating in which grating grooves k or protrusions are formed. That is, a reflecting surface 7a on the concave-surfaced diffracting grating 7 forms a concave surface which forms a circumference having a predetermined curvature in Y-Z plane. The reflecting surface 7a is formed in a free-formed surface in X-Z plane. Grating grooves (or grating protrusion sections) k are formed in X axis direction such that a light-diffracting effect is realized in a surface (Y-Z plane) which is orthogonal in a direction in which a wavelength is dispersed by an angular dispersing element (etalon 17).

The reflecting surface 8a on the reflecting mirror 8 is equivalent to that explained above. The reflecting surface 8a on the reflecting mirror 8 is formed in a free-formed surface having different shapes, for example, between a direction in Y-Z plane and a direction in X-Z plane under condition that a coordinate system is converted at a reflecting surface, and Z axis is in an optical axis direction. If the dispersion should be compensated variably, it is necessary to change the incident position of a light to the reflecting mirror 8 according to the dispersion. For example, as indicated by an arrow shown in FIG. 10, the reflecting mirror 8 should be movable relatively to a reflecting point in a direction which is orthogonal to an incident optical axis in a surface (Y-Z plane) which is orthogonal in a direction in which a wavelength is dispersed by an angular dispersing element. Also, if a dispersion slope should be compensated variably, the reflecting mirror 8 should be moved relatively in X axis direction which is orthogonal to Y-Z plane shown in FIG. 10.

By employing the above structure, it is possible to reduce members for manufacturing the dispersion compensator 20 further; thus, it is possible to manufacture a more compact dispersion compensator 20. In addition, there are two surfaces after the angular dispersing element in an optical path direction; therefore, there is an advantage in that there is less insertion loss.

Next, a dispersion compensating system according to the present invention is explained with reference to FIG. 11.

Figure 11:
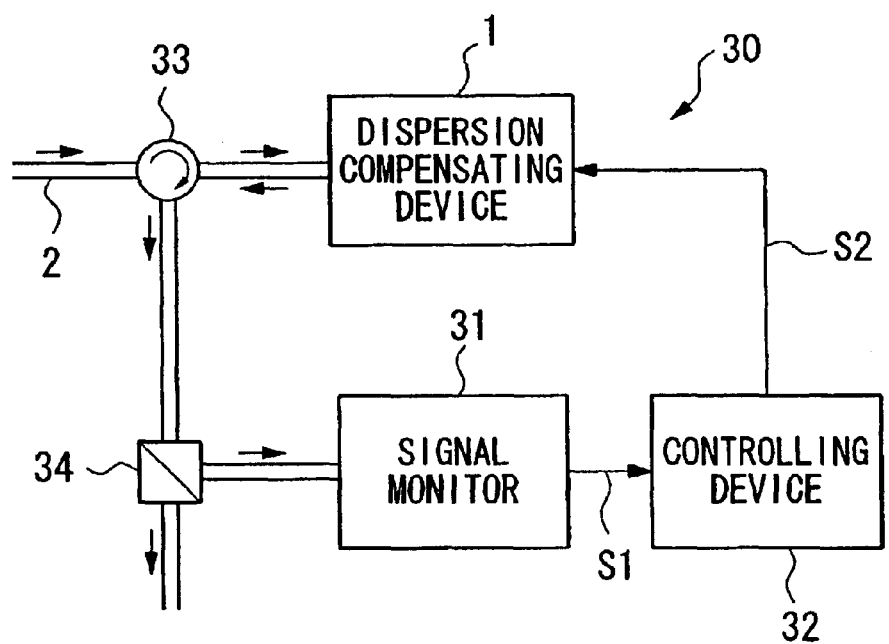
FIG. 11 is a block diagram showing a dispersion compensating system according to the embodiments of the present invention.

As shown in FIG. 11, a dispersion compensating system 30 according to the present embodiment comprises, for example, a dispersion compensator 1 according to a first embodiment, a signal monitor 31 which monitors a light which is ejected from the dispersion compensator 1, and a control device 32 which controls a movement position of the reflecting mirror 1 in Y-Z plane and X-Z plane according to an output from the signal monitor 31.

Here, a circulator 33 is disposed between the optical fiber 2 and the dispersion compensator 1 in the dispersion compensating system 30. The circulator 33 extracts a light which returns from the dispersion compensator 1 while distinguishing a light which is ejected from the circulator 33 and a light which returns from the dispersion compensator 1.

Also, a spectrograph 34 is disposed between the circulator 33 and the signal monitor 31. The spectrograph 34 extracts a part of a light which is outputted from the circulator 33 and of which dispersion is compensated so as to feed a part of the light back to the signal monitor 31.

In a signal monitor 31, it is possible to extract a signal S1 which includes a dispersion information such as a chromatic dispersion and a dispersion slope information such as a dispersion slope by inputting an outputted light from the dispersion compensator 1 of which dispersion is compensated and analyzing the light. In the control device 32, a movement command signal S2 is outputted to the reflecting mirror 8 so as to compensate the chromatic dispersion and the dispersion slope according to the signal S1 which is outputted by the signal monitor 31.

In the dispersion compensating system 30 having the above structure, a chromatic dispersion and the dispersion slope in a light which is transmitted though the optical fiber 2 are compensated by the dispersion compensator 1; thus, the chromatic dispersion and the dispersion slope become 0 (zero). Therefore, a movement command signal S2 which is sent from the control device 32 to the reflecting mirror 8 becomes 0 (zero). Therefore, the reflecting mirror 8 is supported in the current position. That is, if the chromatic dispersion and the dispersion slope in a light which is transmitted through the optical fiber 2 are constantly generated and the compensation therefore is completed, such a condition is maintained.

However, in a case in which factors such as a temperature and a vibration around the optical fiber 2 changes, or in a case in which a frequency bandwidth in an optical signal which is transmitted through the optical fiber 2 changes, the chromatic dispersion and the dispersion slope which are included in the optical signal change. In such cases, a signal S1 which includes various information which indicate whether or not the chromatic dispersion and the dispersion slope are generated in a compensated optical signal which is outputted from the dispersion compensator 1 by which degree is outputted from the signal monitor 31.

Consequently, the control device 32 controls such that the reflecting mirror 8 moves in Y-Z plane or/and X-Z plane by a distance which corresponds to a size of the signal S1. That is, it is possible to adjust the chromatic dispersion and the dispersion slope always in minimum level automatically only by matching the position of the reflecting mirror 8, the dispersion compensation amount and the dispersion slope compensation amount which correspond to a shape of the reflecting surface 8a on the reflecting mirror 8 which is selected under such a current condition in advance.

As explained above, by the dispersion compensating system 30 according to the present embodiment, it is possible to adjust the chromatic dispersion and the dispersion slope in minimum level automatically; therefore, there is an advantage in that it is possible to control the loss in an optical signal even in a futuristic possible case in which a transmitting speed for an optical signal may increase and the chromatic dispersion and the dispersion slope may tend to fluctuate easily because of external factors such as a temperature and a vibration there.

Here, in the dispersion compensating system 30 according to the above present embodiment, the reflecting mirror 8 can move in Y-Z plane and X-Z plane; thus, the chromatic dispersion and the dispersion slope are compensated. However, it may be acceptable if the reflecting mirror 8 is moved to either one of surfaces and either one of the chromatic dispersion and the dispersion slope is compensated.

Also, in the dispersion compensating system 30, it may be acceptable if a second reflecting mirror 11 is disposed in the dispersion compensator 1A instead of the reflecting mirror 8. Also, it may be acceptable if an optical deflecting device is employed rotatively in various forms such a reflecting diffracting grating instead of the second reflecting mirror 11, a rotating mirror 15 which is disposed in the dispersion compensator 14, and a third rotating mirror 18 which is disposed in the dispersion compensator 16.

Otherwise, it may be acceptable if the dispersion slope and the like are automatically adjusted in minimum level by moving the dispersion compensator 16 and the concave-surfaced diffracting grating 7 in the dispersion compensator 24.

By the dispersion compensator according to the present invention as explained above, it is possible to compensate the chromatic dispersion and the dispersion slope simultaneously. Also, it is possible to diffract and condense a light by the diffracting optical element. Therefore, it is possible to realize a small device manufactured by less number of members therefore. Also, there is an effect in that there is less change in the insertion loss regardless to the chromatic dispersion and the dispersion slope to be compensated.

According to the present invention, a deteriorated optical signal due to the dispersion and the dispersion slope in the optical transfer element is compensated by extracting a light which is transmitted through an optical transfer element such as an optical fiber and modulated, varying a ejecting angle of a light according to the wavelengths in directions which are crossing each other or orthogonal each other by using an angular dispersing element and a diffracting optical element, and reflecting such a light on a reflecting surface on a reflecting mirror. In particular, by forming a diffracting optical element which is provided with a concave reflecting surface and a light-diffracting function, it is possible to realize a small device in which there is less insertion loss and less members for manufacturing therefore are required.

In addition, in an optical communication system which uses WDM technology, it is possible to compensate the dispersion and the dispersion slope simultaneously. Therefore, it is possible to realize an optical system in which there is less insertion loss regardless to the dispersion and the dispersion slope to be compensated.

In the present invention, for an angular dispersing element, it is possible to use any element as long as an ejecting angle of a light which is ejected differs according to the wavelength of a light which is incident. For example, a light which is ejected from an optical transfer element becomes a light which is condensed in only an axial direction and incident to an angular dispersing element. Such a light which is condensed in only an axial direction is ejected as a light of which ejecting angle is different according to the wavelength in a direction in a plane which includes a direction in which a light is condensed. A light having different ejecting angles according to the wavelengths is reflected on a reflecting mirror which has a reflecting surface having different reflecting positions in a plane which includes a direction of chromatic dispersion by an angular dispersing element and returns the same optical path reversely. If this reflecting surface on the reflecting mirror is, for example, a free-formed surface having an optical path length difference which corresponds to the dispersion, it is possible to have a difference of an entire optical path length according to the reflecting position. Therefore, it is possible to compensate a group delay due to the wavelength by having such an optical path length difference.

If a dispersion is small in an angular dispersing element, it is necessary to set a longer distance from the angular dispersing element to the reflecting mirror; therefore, a device may become larger accordingly. Otherwise, it is not possible to separate the wavelength, and it is difficult to compensate the dispersion. Therefore, it is preferable that a dispersion in an angular dispersing element should be large in a certain degree.

On the other hand, if a wavelength is extracted from a light which is ejected from the angular dispersing element, such a light is an approximate parallel light. This light is incident to a diffracting optical element. Consequently, a light which is reflected in a diffracting optical element becomes a convergent diffracted light of which ejecting angle changes according to the wavelength. Such a diffracted light is condensed on a reflecting point on a reflecting surface on a reflecting mirror.

A reflecting mirror is formed in a reflecting surface shape such that the dispersion slope is compensated in a plane which is orthogonal to a direction of chromatic dispersion by an angular dispersing element by ejecting from the diffracting optical element and reflecting a light of which ejecting angle changes according to the wavelength. This reflecting surface has a different cross section from a cross section in a plane which includes a direction of chromatic dispersion by an angular dispersing element. Also, in this reflecting surface, a reflecting position for an ejected light of which ejecting angle changes according to a wavelength from the concave-surfaced diffracting grating is different from a reflecting position in a plane which includes a direction of chromatic dispersion by an angular dispersing element.

In the present invention, deteriorations in an optical signal due to the dispersion and the dispersion slope in an optical transfer element are compensated by changing an ejecting angle of a light according to the wavelength in directions which are orthogonal or crossing each other and reflecting the light on a reflecting surface on a reflecting mirror by using the angular element and the diffracting optical element.

In the present invention, it is possible to realize equivalent function to that of the above dispersion compensator. In particular, in the present invention, a light which is ejected from an angular dispersing element is an approximate parallel light if one wavelength is extracted. A light which is transmitted through an optical element becomes a convergent light and is focused in a position of a focal distance. Consequently, the light becomes a divergent light again from this focal position (primary focus point) and goes forward and incident to the diffracting optical element. A light which is reflected by a diffracting optical element becomes a convergent diffracted light of which ejecting angle changes according to the wavelength, and the diffracted light is condensed on a reflecting point on a reflecting mirror.

A primary focus position, a reflecting point on a diffracting optical element, and a reflecting surface on a reflecting mirror are disposed on a circumference. It is important that a diameter of the circumference is equal to a radius of curvature of an diffracting optical element. Such a geometrical relationship is called as a Row-land circle. In such a relationship, a diffracting optical element satisfies a diffracting function and an image-focusing function simultaneously. This diffracting optical element has a light-dispersing function and an image-focusing function by itself Here, a primary focusing position is disposed on a Row-land circle; therefore, a diffracted image which is dispersed by a diffracting optical element is focused on the same Row-land circle infallibly by any random combination of a grating constant, a wavelength, and degree. In addition, it is possible to understand that there is no substantial aberration except astigmatism. Therefore, by replacing a conventional transmitting diffracting optical element by a reflecting diffracting optical element, it is possible to condense a light toward a reflecting mirror because less number of surfaces are formed, and less light is absorbed; thus, aberration can be reduced. Therefore, it is possible to compensate the dispersion and the dispersion slope very accurately while reducing the insertion loss in an overall device.

According to the present invention, in addition to a wavelength dispersing function by the above angular dispersing element and the diffracting optical element, it is possible to scan the light flux by an optical deflecting device and change an incident position of the light flux to the diffracting optical element. Therefore, it is possible to change the dispersion by changing a diffracting frequency in the diffracting optical element according to areas; thus, it is possible to vary the dispersion slope.

Here, it may be acceptable that an optical deflecting device is rotatable in a axis or in both axes in a plane which is orthogonal to a direction of chromatic dispersion by an angular dispersing element and a surface which includes a directioin in which a wavelength is dispersed. By doing this, it is possible to vary the dispersion and the dispersion slope without making a device in a large size which needs large space.

A primary focus position, a reflecting point on a diffracting optical element, and a reflecting surface on a reflecting mirror are on a circumference. A diameter of such a circumference is equal to a radius of curvature of a diffracting optical element. Such a geometrical relationship is called as a Row-land circle. In such a relationship, a diffracting optical element satisfies a diffracting function and an image-focusing function simultaneously. This diffracting optical element has a light-dispersing function and an image-focusing function by itself. Here, a primary focusing position is disposed on a Row-land circle; therefore, a diffracted image which is dispersed by a diffracting optical element is focused on the same Row-land circle infallibly by any random combination of a grating constant, a wavelength, and degree. In addition, it is possible to understand that there is no substantial aberration except astigmatism. Therefore, by replacing a conventional transmitting diffracting optical element by a reflecting diffracting optical element, it is possible to condense a light toward a reflecting mirror because less light is absorbed; thus, aberration can be reduced. Therefore, it is possible to compensate the dispersion and the dispersion slope very accurately while reducing the insertion loss in an overall device.

When grating pitches on a concave-surfaced diffracting grating is formed such that the pitches of grating pitches on a concave-surfaced diffracting grating differ according to a region of which frequency is divided in a direction in which a concave reflecting surface expands, the grating frequency changes stepwise. Therefore, it is possible to vary the dispersion slope to be compensated by changing the angular dispersion.

In the dispersion compensator according to the present invention, only a primary diffracted light is used in a diffraction at a concave-surfaced diffracting grating, it is possible to reduce the loss. Therefore, it is preferable to use a diffracting grating which has a blaze angle. Under such a condition, it is preferable that the blaze angle is a central wavelength in an inputted light which is inserted in the dispersion compensator. In a case in which a diffracting grating is used for an angular dispersing element, it may be acceptable that the diffracting grating has a surface which has a blaze angle. In this case, it is possible to realize the same effect.

In the present invention, a focusing position by a diffracting optical element is always formed on a point on a reflecting surface on a reflecting mirror regardless to an incident position of a light to a diffracting optical element.

A diffracting optical element rotates around a fulcrum which is a center of a curvature of a concave reflecting surface. By doing this, a focus position (primary focusing point) of an optical element, a diffracting optical element, and a reflecting surface on a reflecting mirror are disposed on a Row-land circle geometrically even if a grating pitch is changed. Therefore, a reflecting point by an optical element is always a point on a reflecting surface; thus, it is possible to realize a highly accurate compensation.

A reflecting surface on a reflecting mirror can change an optical path length according to a change in a reflecting angle due to the wavelength of a light which is diffracted by a diffracting optical element; thus, it is possible to obtain a desirable dispersion slope so as to perform a necessary compensation.

A reflecting surface on a reflecting mirror can change an optical path length of a light of which ejecting angle can be changed by an angular dispersing element; thus, it is possible to obtain a desirable dispersion slope so as to perform a necessary compensation.

A reflecting surface on a reflecting mirror can be formed so as to correspond to the dispersion and the dispersion slope to be compensated; thus, it is possible to realize a highly accurate compensation.

In the present invention, a reflecting surface on a reflecting mirror is disposed in an inclined manner; therefore, there is an effect that an optical path length changes according to a change of a reflecting angle due to the wavelength in a light which is diffracted by a diffracting optical element. In addition, production cost can be cheap because of its simple shape.

It is possible to restrict a change in a reflection ratio by moving a reflecting position of the reflecting surface in an approximate vertical direction to an optical axis when a reflecting position on a reflecting surface is changed by the dispersion and the dispersion slope to be compensated.

According to the present invention, it is possible to vary the dispersion to be compensated.

According to the present invention, it is possible to vary the dispersion slope to be compensated.

According to the present invention, a concave-surfaced diffracting element is used for a diffracting optical element; thus, it is possible to correct astigmatism in a plane which includes a direction of chromatic dispersion by an angular dispersing element which is generated according to a theory of the Row-land circle by using the above concave-surfaced diffracting grating.

In the present invention, it is possible to correct the aberrations only by a concave-surfaced diffracting grating; therefore, it is possible to realize a system with low less.

In the present invention, it is possible to realize a power in a plane which includes a direction of chromatic dispersion by an angular dispersing element different from that in a reflecting surface in a plane which is orthogonal to a direction of chromatic dispersion; therefore, it is possible to correct astigmatism.

According to the present invention, it is possible to correct not only astigmatism but also other aberrations which are generated in an overall optical system.

According to the present invention, it is possible to correct astigmatism by a cylindrical lens, an anamorphotic lens, and a free-formed lens which are disposed separately if it is difficult to form a concaved-surfaced diffracting grating and an anamorphotic surface and a free-formed surface cannot be formed.

According to the present invention, a reflecting surface in an optical deflecting device is formed in a plane which has a positive power for condensing a light; therefore, it is possible to reflect a light so as to deflect and condense a light toward a diffracting optical element. Thus, it is possible to reduce lenses and restrict the loss.

According to the present invention, an optical deflecting device is disposed between an angular dispersing element and a diffracting optical element, and a reflecting diffracting grating surface is used for such an optical deflecting device. By doing this, it is possible to realize an angular dispersion as a total of a dispersion of a diffracting optical element and a reflecting diffracting grating. Such a structure is effective for a case in which a large chromatic dispersion is necessary.

According to the present invention, a concave mirror is disposed for an optical element which has a light-condensing function between an angular dispersing element and a diffracting optical element. By doing this, it is possible to reduce the lenses and restrict the loss.

According to the present invention, it is possible to correct astigmatism by a diffracting optical element which is generated due to a theory of the Row-land circle.

According to the present invention, it is possible to correct astigmatism by a diffracting optical element which is generated due to a theory of Row-land circle and correct aberrations in an overall optical system simultaneously.

According to the present invention, dispersion information and dispersion slope information for a light are output-ted from the signal monitor such that either one or both of chromatic dispersion and dispersion slope are compensated by a dispersion compensator. A movement position of a reflecting mirror is controlled by a control device according to these information. Therefore, at least either one of the chromatic dispersion or the dispersion slope is determined under condition that a length of an optical transfer element or the like is determined. In a case in which a position of a reflecting mirror so as to realize a desirable compensation is determined accordingly, compensation is performed temporarily when the chromatic dispersion or the dispersion slope vary due to other factors.

What is claimed is:

1. A dispersion compensator comprising:
   an angular dispersion element for changing an angle of a light which is ejected from an optical transfer element according to a wavelength in the ejected light;
   a diffracting optical element having at least a concave reflecting surface so as to diffract the ejected light; and
   a reflecting mirror having a reflecting surface which is disposed near a focal point in an entire optical system of which surface shape of the reflecting mirror changes in a dispersing direction of the ejected light according to the wavelength in the ejected light.

2. A dispersion compensator comprising:
   an angular dispersion element for changing an angle of a light which is ejected from an optical transfer element according to a wavelength in the ejected light;
   an optical element having a light-condensing function;
   a diffracting optical element having at least a concave reflecting surface so as to diffract the ejected light; and
   a reflecting mirror having a reflecting surface which is disposed near a focal point in an entire optical system of which surface shape of the reflecting mirror changes in a dispersing direction of the ejected light according to the wavelength in the ejected light.

3. A dispersion compensator according to claim 2 wherein the focal point in which an image is focused by the optical element and the reflecting surface of the reflecting mirror are disposed on a circumference which is formed according to a radius of curvature in the concave reflecting surface in the diffracting optical element.

4. A dispersion compensator comprising:
   an angular dispersion element for changing an angle of a light which is ejected from an optical transfer element according to a wavelength in the ejected light;
   an optical element having a light-condensing function;
   an optical deflecting device for deflecting a light which is ejected from the optical element near a focal point in which the light which is ejected from the optical element is focused;
   a diffracting optical element having at least a concave reflecting surface so as to diffract the ejected light; and
   a reflecting mirror having a reflecting surface which is disposed near a focal point in an entire optical system of which surface shape of the reflecting mirror changes in a dispersing direction of the ejected light according to the wavelength in the ejected light.

5. A dispersion compensator according to claim 4 wherein the reflecting surface on the optical deflecting device and the reflecting surface on the reflecting mirror are disposed on a circumference which is formed according to a radius of curvature in the concave reflecting surface in the diffracting optical element.

6. A dispersion compensator according to claim 1 wherein:

the diffracting optical element is a concave-surfaced diffracting grating, and
a grating pitch in the concave-surfaced diffracting grating differs according to an area on a concave-surfaced reflecting surface.

7. A dispersion compensator according to claim 6 wherein the grating pitch in the concave-surfaced diffracting grating differs according to an area in a direction orthogonal to a direction of chromatic dispersion by the angular dispersion element which is disposed on the concave reflecting surface.

8. A dispersion compensator according to claim 1 wherein:
the diffracting optical element is a concave-surfaced diffracting grating; and
the diffracting grating is provided with a blaze angle.

9. A dispersion compensator according to claim 2 wherein the focal point in which an image is focused by the optical element and the reflecting surface of the reflecting mirror are movable such that the focal point in which an image is focused by the optical element and the reflecting surface of the reflecting mirror maintain such a relationship to be disposed on a circumference which is formed according to a radius of curvature in the concave reflecting surface in the diffracting optical element.

10. A dispersion compensator according to claim 9 wherein the diffracting optical element can be rotated around a fulcrum which is disposed in a center of a curvature in the reflecting surface of the diffracting optical element.

11. A dispersion compensator according to claim 1 wherein the reflecting surface on the reflecting mirror has a power at least in a plane orthogonal to a direction of chromatic dispersion by the angular dispersion element.

12. A dispersion compensator according to claim 1 wherein the reflecting surface on the reflecting mirror has a power at least in a plane which includes a direction of chromatic dispersion by the angular dispersion element.

13. A dispersion compensator according to claim 1 wherein the reflecting surface on the reflecting mirror is formed in rotatively an asymmetrical free-form surface.

14. A dispersion compensator according to claim 1 wherein the reflecting surface on the reflecting mirror is provided with a surface which is disposed diagonally in an incident optical axis at least in a plane which includes a direction of chromatic dispersion by the angular dispersion element.

15. A dispersion compensator according to claim 1 wherein the reflecting surface on the reflecting mirror is movable in a direction approximately orthogonal to an incident optical axis.

16. A dispersion compensator according to claim 1 wherein the reflecting surface on the reflecting mirror is movable at least in a plane which includes a direction of chromatic dispersion by the angular dispersion element.

17. A dispersion compensator according to claim 1 wherein the reflecting surface on the reflecting mirror is movable in a surface orthogonal to a direction of chromatic dispersion by the angular dispersion element.

18. A dispersion compensator according to claim 1 wherein an optical surface or an optical member which has a positive power is disposed in a plane which includes at least a surface in a direction of chromatic dispersion by the angular dispersion element in an optical path between the angular dispersion element and the reflecting surface on the reflecting mirror.

19. A dispersion compensator according to claim 18 comprising said optical surface wherein the optical surface which has a positive power in a plane which includes a direction of chromatic dispersion by the angular dispersion element is a reflecting surface made by a concave-surfaced diffracting grating.

20. A dispersion compensator according to claim 19 wherein the reflecting surface made by the concave-surfaced diffracting grating is an anamorphotic surface.

21. A dispersion compensator according to claim 19 wherein the reflecting surface made by the concave-surfaced diffracting grating is rotatively an asymmetrical free-form surface.

22. A dispersion compensator according to claim 18 comprising said optical member wherein the optical member which has a positive power in a plane which includes a direction of chromatic dispersion by the angular dispersion element is a cylindrical lens which is disposed between the angular dispersion element and the reflecting mirror.

23. A dispersion compensator according to claim 18 wherein the optical member which has a positive power in a plane which includes a direction of chromatic dispersion by the angular dispersion element is an anamorphotic lens which is disposed between the angular dispersion element and the reflecting mirror.

24. A dispersion compensator according to claim 18 comprising said optical member wherein the optical member which has a positive power in a plane which includes a direction of chromatic dispersion by the angular dispersion element is a free-form-surfaced lens which is disposed between the angular dispersion element and the reflecting mirror.

25. A dispersion compensator according to claim 2 wherein the optical element is an optical deflecting device which is provided with a reflecting surface which has a positive power.

26. A dispersion compensator according to claim 25 wherein the optical deflecting device is a reflecting diffracting grating.

27. A dispersion compensator according to claim 2 wherein the optical element is a concave-surfaced mirror having a positive power which is disposed between the angular dispersion element and the diffracting optical element.

28. A dispersion compensator according to claim 27 wherein the concave-surfaced mirror is an anamorphotic concave-surfaced mirror.

29. A dispersion compensator according to claim 2 wherein the optical element is provided with a free-form reflecting surface which is disposed between the angular dispersion element and the diffracting optical element.

30. A dispersion compensator according to claim 1 wherein the angular dispersion element is an interferometer.

31. A dispersion compensator according to claim 1 wherein the angular dispersion element is a Fabry-Pérot-interferometer.

32. A dispersion compensator according to claim 1 wherein the angular dispersion element is an etalon.

33. A dispersion compensator according to claim 1 wherein the angular dispersion element is a virtually-imaged-phased-array (VIPA).

34. A dispersion compensator according to claim 1 wherein the angular dispersion element is a diffracting grating.

35. A dispersion compensator according to claim 34 wherein the diffracting grating is provided with a surface having a blaze angle.

36. A dispersion compensator according to claim 1 wherein the angular dispersion element is a prism.

37. A dispersion compensating system comprising:

a dispersion compensator according to claim 1, a signal monitor which monitors a light which is ejected from the dispersion compensator and outputs a signal which contains at least an information for a chromatic dispersion of the light or an information for a dispersion slope; and a control device which controls a movement of the reflecting mirror such that at least a chromatic dispersion or a dispersion slope is reduced according to the signal which is outputted from the signal monitor.

38. A dispersion compensating system comprising:

a dispersion compensator according to claim 1, a signal monitor which monitors a light which is ejected from the dispersion compensator and outputs a signal which contains at least an information for a chromatic dispersion of the light or an information for a dispersion slope; and a control device which controls a movement of the diffracting optical element such that at least a dispersion or a dispersion slope is reduced according to the signal which is outputted from the signal monitor.

39. A dispersion compensating system comprising:

a dispersion compensator according to claim 4, a signal monitor which monitors a light which is ejected from the dispersion compensator and outputs a signal which contains at least an information for a dispersion of the light or an information for a dispersion slope; and a control device which controls a deflecting angle by the light deflecting device such that at least a dispersion or a dispersion slope is reduced according to the signal which is outputted from the signal monitor.

\* \* \* \* \*